United States Patent
Bechstein et al.

(10) Patent No.: US 11,997,777 B2
(45) Date of Patent: May 28, 2024

(54) ELECTROSTATIC DISCHARGE ROBUST DESIGN FOR INPUT DEVICE

(71) Applicant: Apple Inc., Cupertino, CA (US)

(72) Inventors: Daniel Jacob Benjamin Bechstein, Pacifica, CA (US); MohammadAli Khorrami, San Jose, CA (US); Vipin Ayanoor-Vitikkate, Pleasanton, CA (US); Blake R. Marshall, San Jose, CA (US); Zhibin Wang, San Jose, CA (US); Ying Cao, Santa Clara, CA (US); Robert Ubo Liu, San Jose, CA (US); John Stephen Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/031,570

(22) Filed: Sep. 24, 2020

(65) Prior Publication Data

US 2022/0095443 A1 Mar. 24, 2022

(51) Int. Cl.
*H05F 3/00* (2006.01)
*G06F 3/0354* (2013.01)
*G06F 3/044* (2006.01)

(52) U.S. Cl.
CPC ............ *H05F 3/00* (2013.01); *G06F 3/03545* (2013.01); *G06F 3/0442* (2019.05); *G06F 3/0446* (2019.05)

(58) Field of Classification Search
CPC ....................................................... H05F 3/00
(Continued)

(56) References Cited

U.S. PATENT DOCUMENTS

| 5,414,227 A | 5/1995 | Schubert et al. |
| 7,567,414 B2 | 7/2009 | Bertin et al. |

(Continued)

FOREIGN PATENT DOCUMENTS

| CN | 107368203 A | 11/2017 |
| EP | 2466431 A1 | 6/2012 |

(Continued)

OTHER PUBLICATIONS

Advisory Action received for U.S. Appl. No. 14/848,289, dated Sep. 25, 2018, 3 pages.

(Continued)

*Primary Examiner* — Ruay Ho
(74) *Attorney, Agent, or Firm* — Kubota & Basol LLP

(57) ABSTRACT

An electrostatic discharge (ESD) robust design for an input device such as a stylus is disclosed. The input device can include one or more components, such as one or more Schottky diodes, that can be damaged by ESD events. To reduce the likelihood of damage to sensitive components, the parasitic capacitance between sensitive conductive paths and reference ground paths of the input device that could otherwise provide electrostatic discharge paths can be reduced (arranging current limiting resistance at specific locations among sensitive components, creating physical separation between sensitive conductive paths and reference ground paths), shielding can be added to shield the sensitive electronics from ESD pulses, and high dielectric breakdown material can be added to prevent ESD pulse entry or exit of not otherwise protected circuit parts.

18 Claims, 10 Drawing Sheets

(58) Field of Classification Search
USPC ......... 361/220; 324/662, 649; 345/174, 179; 606/41
See application file for complete search history.

(56) References Cited

U.S. PATENT DOCUMENTS

| | | | |
|---|---|---|---|
| 8,199,132 B1 | 6/2012 | Oda et al. | |
| 8,493,359 B2 | 7/2013 | Wright et al. | |
| 8,547,114 B2 | 10/2013 | Kremin | |
| 8,587,535 B2 | 11/2013 | Oda et al. | |
| 8,657,814 B2* | 2/2014 | Werneth | A61B 5/742 606/41 |
| 8,773,405 B1 | 7/2014 | Ryshtun et al. | |
| 8,816,985 B1 | 8/2014 | Tate et al. | |
| 8,854,147 B2 | 10/2014 | Lin | |
| 9,018,547 B2 | 4/2015 | Rimon et al. | |
| 9,117,677 B2 | 8/2015 | Ma et al. | |
| 9,189,088 B2 | 11/2015 | Tsao et al. | |
| 9,201,547 B2 | 12/2015 | Elias et al. | |
| 9,310,943 B1 | 4/2016 | Omelchuk et al. | |
| 9,383,835 B2 | 7/2016 | Lo et al. | |
| 9,594,440 B2 | 3/2017 | Park et al. | |
| 9,606,680 B1 | 3/2017 | Sundara-Rajan | |
| 9,612,671 B1 | 4/2017 | Blaszczak et al. | |
| 9,665,184 B2 | 5/2017 | Hara | |
| 10,558,293 B2 | 2/2020 | Wigdor et al. | |
| 11,079,862 B2 | 8/2021 | Brunet et al. | |
| 11,079,888 B1 | 8/2021 | Gray et al. | |
| 11,287,926 B1 | 3/2022 | Shahsavari et al. | |
| 11,526,240 B1 | 12/2022 | Bechstein et al. | |
| 2005/0264528 A1 | 12/2005 | Burry | |
| 2007/0195068 A1 | 8/2007 | Kable et al. | |
| 2008/0156546 A1 | 7/2008 | Hauck | |
| 2009/0008162 A1 | 1/2009 | Yang et al. | |
| 2009/0273579 A1 | 11/2009 | Zachut et al. | |
| 2009/0289922 A1 | 11/2009 | Henry | |
| 2010/0117661 A1* | 5/2010 | Bruwer | G06F 3/0446 324/662 |
| 2010/0315384 A1 | 12/2010 | Hargreaves et al. | |
| 2011/0063154 A1 | 3/2011 | Hotelling et al. | |
| 2011/0297458 A1 | 12/2011 | Mao et al. | |
| 2012/0007608 A1* | 1/2012 | Hadwen | G09G 3/348 324/649 |
| 2012/0068957 A1 | 3/2012 | Puskarich et al. | |
| 2012/0146960 A1 | 6/2012 | Shih et al. | |
| 2012/0154340 A1 | 6/2012 | Vuppu et al. | |
| 2012/0268428 A1 | 10/2012 | Nakata et al. | |
| 2012/0278031 A1 | 11/2012 | Oda et al. | |
| 2012/0327042 A1 | 12/2012 | Harley et al. | |
| 2012/0331546 A1 | 12/2012 | Falkenburg et al. | |
| 2013/0088465 A1 | 4/2013 | Geller et al. | |
| 2013/0106718 A1 | 5/2013 | Sundara-rajan | |
| 2013/0141397 A1 | 6/2013 | Dunagan | |
| 2013/0194225 A1 | 8/2013 | Shen et al. | |
| 2013/0285900 A1 | 10/2013 | Liu | |
| 2014/0146009 A1 | 5/2014 | Huang | |
| 2015/0091856 A1 | 4/2015 | Park et al. | |
| 2015/0123923 A1 | 5/2015 | Stern | |
| 2015/0123932 A1* | 5/2015 | Collins | G06F 3/03545 345/174 |
| 2015/0138164 A1 | 5/2015 | Hinson | |
| 2015/0160744 A1 | 6/2015 | Mohindra et al. | |
| 2015/0193024 A1 | 7/2015 | Kai et al. | |
| 2015/0277618 A1 | 10/2015 | Bulea | |
| 2015/0309598 A1* | 10/2015 | Zeliff | H02H 9/043 345/179 |
| 2015/0355732 A1 | 12/2015 | Mann | |
| 2016/0048224 A1 | 2/2016 | Brunet et al. | |
| 2016/0162045 A1 | 6/2016 | Vincent | |
| 2016/0179271 A1 | 6/2016 | Vandermeijden | |
| 2016/0266663 A1 | 9/2016 | Holsen | |
| 2016/0313825 A1 | 10/2016 | Hotelling et al. | |
| 2016/0320913 A1 | 11/2016 | Gao et al. | |
| 2017/0010697 A1 | 1/2017 | Jiang et al. | |
| 2017/0068344 A1 | 3/2017 | Bhandari et al. | |
| 2017/0075441 A1 | 3/2017 | Leigh et al. | |
| 2017/0075446 A1 | 3/2017 | Vandermeijden | |
| 2017/0212635 A1 | 7/2017 | Cordeiro et al. | |
| 2017/0262076 A1 | 9/2017 | Hara | |
| 2017/0262100 A1 | 9/2017 | Leigh et al. | |
| 2017/0285772 A1 | 10/2017 | Yamamoto | |
| 2017/0308189 A1 | 10/2017 | Peretz et al. | |
| 2017/0344174 A1 | 11/2017 | Pant et al. | |
| 2018/0081477 A1 | 3/2018 | Picciotto et al. | |
| 2018/0181245 A1 | 6/2018 | Beck et al. | |
| 2018/0246585 A1 | 8/2018 | Hara | |
| 2018/0284909 A1 | 10/2018 | Laslo et al. | |
| 2018/0309190 A1 | 10/2018 | Niakan | |
| 2018/0338065 A1 | 11/2018 | Zyskind et al. | |
| 2019/0155408 A1 | 5/2019 | Hou et al. | |
| 2019/0155411 A1 | 5/2019 | Kinrot et al. | |
| 2019/0220187 A1 | 7/2019 | Budd | |
| 2019/0324561 A1 | 10/2019 | Anderson et al. | |
| 2019/0324564 A1 | 10/2019 | Brunet et al. | |
| 2019/0339356 A1* | 11/2019 | Schildknecht | G01S 7/4804 |
| 2019/0371787 A1* | 12/2019 | Mandal | H01L 27/0288 |
| 2020/0019257 A1 | 1/2020 | Chang et al. | |
| 2020/0159386 A1 | 5/2020 | Saito et al. | |
| 2020/0192521 A1 | 6/2020 | Case et al. | |
| 2020/0201505 A1 | 6/2020 | Jung et al. | |
| 2020/0218322 A1 | 7/2020 | Gray et al. | |
| 2021/0026464 A1 | 1/2021 | Yamada et al. | |
| 2021/0232240 A1 | 7/2021 | Smith | |
| 2021/0240325 A1* | 8/2021 | Smith | G06F 3/0441 |
| 2021/0255735 A1 | 8/2021 | Gray et al. | |
| 2021/0286493 A1* | 9/2021 | Wang | G06F 3/04142 |
| 2021/0303151 A1 | 9/2021 | Morrison et al. | |
| 2021/0303152 A1 | 9/2021 | Hosur et al. | |
| 2021/0325444 A1* | 10/2021 | Chong | G01R 31/2635 |
| 2022/0091685 A1 | 3/2022 | Bechstein et al. | |
| 2022/0100310 A1 | 3/2022 | Shahsavari et al. | |
| 2022/0100341 A1 | 3/2022 | Seyed Mousavi et al. | |
| 2022/0334658 A1 | 10/2022 | Dekel et al. | |
| 2023/0152911 A1 | 5/2023 | Bechstein et al. | |
| 2023/0273687 A1 | 8/2023 | Bechstein et al. | |

FOREIGN PATENT DOCUMENTS

| | | | | |
|---|---|---|---|---|
| EP | 2624104 A2 | 8/2013 | | |
| EP | 2672494 A1 | 12/2013 | | |
| EP | 2813918 A1 | 12/2014 | | |
| EP | 2624104 A3 | 3/2016 | | |
| EP | 3326050 A1 | 5/2018 | | |
| WO | 2017/044428 A1 | 3/2017 | | |
| WO | WO2019036857 A1 * | 2/2019 | | G01R 31/28 |
| WO | 2020/023640 A1 | 1/2020 | | |
| WO | WO-2020023640 A1 * | 1/2020 | | G06F 3/03545 |
| WO | 2020/027818 A1 | 2/2020 | | |

OTHER PUBLICATIONS

Final Office Action received for U.S. Appl. No. 14/848,289, dated Jun. 21, 2018, 11 pages.
International Search Report received for PCT Patent Application No. PCT/US2016/048590, dated Feb. 7, 2017, 6 pages.
International Search Report received for PCT Patent Application No. PCT/US2016/048630, dated Nov. 18, 2016, 3 pages.
Non Final Office Action received for U.S. Appl. No. 14/848,277, dated Nov. 18, 2016, 18 Pages.
Non Final Office Action received for U.S. Appl. No. 14/848,277, dated Sep. 19, 2017, 11 Pages.
Non-Final Office Action received for U.S. Appl. No. 14/848,289, dated Nov. 3, 2017, 18 pages.
Non-Final Office Action received for U.S. Appl. No. 14/848,289, dated Nov. 17, 2016, 11 pages.
Non-Final Office Action received for U.S. Appl. No. 16/836,789, dated Oct. 1, 2021, 27 pages.
Non-Final Office Action received for U.S. Appl. No. 17/031,549, dated Oct. 20, 2021, 13 pages.
Non-Final Office Action received for U.S. Appl. No. 17/031,549, dated Sep. 29, 2021, 14 pages.

(56) References Cited

OTHER PUBLICATIONS

Notice of Allowance received for U.S. Appl. No. 14/848,277, dated May 8, 2018, 5 Pages.
Notice of Allowance received for U.S. Appl. No. 14/848,289, dated Nov. 21, 2018, 6 pages.
Notice of Allowance received for U.S. Appl. No. 16/836,789, dated Feb. 18, 2022, 9 pages.
Notice of Allowance received for U.S. Appl. No. 17/031,549, dated Feb. 1, 2022, 8 pages.
Notice of Allowance received for U.S. Appl. No. 17/161,499, dated Aug. 12, 2021, 9 pages.
Notice of Allowance received for U.S. Appl. No. 17/161,499, dated Dec. 1, 2021, 8 pages.
Notice of Allowance received for U.S. Appl. No. 16/836,789, dated May 25, 2022, 8 Pages.
Notice of Allowance received for U.S. Appl. No. 17/031,549, dated May 6, 2022, 8 pages.
Non-Final Office Action received for U.S. Appl. No. 17/448,866, dated Nov. 10, 2022, 20 pages.
Final Office Action received for U.S. Appl. No. 17/448,866, dated Jun. 1, 2023, 19 pages.
Notice of Allowance received for U.S. Appl. No. 17/448,774, dated Aug. 16, 2022, 8 pages.
Notice of Allowance received for U.S. Appl. No. 17/448,774, dated May 4, 2022, 10 pages.
Notice of Allowance received for U.S. Appl. No. 17/448,866, dated Oct. 12, 2023, 5 pages.

\* cited by examiner

ELECTROSTATIC DISCHARGE ROBUST DESIGN FOR INPUT DEVICE

FIELD

This relates to an input device such as a stylus for providing input to a touch-sensitive surface, and more particularly, to an electrostatic discharge robust design for the input device.

BACKGROUND

Many types of input devices are presently available for performing operations in a computing system, such as buttons or keys, mice, trackballs, joysticks, touch panels, touch screens and the like. Touch screens, in particular, are popular because of their ease and versatility of operation as well as their declining price. Touch screens can include a touch panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch panel using a finger, stylus or other object at a location often dictated by a user interface (UI) being displayed by the display device. In general, touch screens can recognize a touch and the position of the touch on the touch panel, and the computing system can then interpret the touch in accordance with the display appearing at the time of the touch, and thereafter can perform one or more actions based on the touch. In some examples, touch panels can be included in other input devices that are separate from any display screen, such as trackpads. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

As mentioned above, a stylus is one type of input device that can provide touch input. In some examples, a stylus can be an active stylus that includes a power supply and generates a stylus signal that can be detected by a touch-sensitive surface of the electronic device. The electronic device can detect an active stylus by detecting the stylus signal, which can capacitively couple to one or more touch electrodes of the touch-sensitive surface. In other examples, a stylus can be a passive stylus that does not include a power supply. The passive stylus can include one or more conductive components that can capacitively couple to an electrode of the touch screen to produce or modify a received signal that is thereafter sensed by the electronic device. For example, a passive stylus may reduce the capacitive coupling between a drive line and a sense line of the touch-sensitive surface by also being capacitively coupled to the drive and sense lines, thereby modifying the signal sensed by the sense line, thus enabling the electronic device to detect the stylus.

SUMMARY

This relates to an input device such as a stylus for providing input to a touch-sensitive surface, and more particularly, to an electrostatic discharge (ESD) robust design for the input device. In some examples, the input device can include one or more components, such as one or more diodes, that can be damaged by ESD events. To reduce the likelihood of damage to sensitive components, some examples of the disclosure reduce the parasitic capacitance between sensitive conductive paths and reference ground paths of the input device that could otherwise provide ESD paths to earth ground. In some examples, parasitic capacitance can be reduced by adding shielding, arranging current limiting resistance at specific locations among sensitive components, creating physical separation between sensitive conductive paths and reference ground paths, or adding high dielectric breakdown material.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure relate to a handheld input device such as a stylus for providing input to a touch-sensitive surface, and more particularly, to an electrostatic discharge (ESD) robust design for the input device. In some examples, the input device can include one or more components, such as one or more diodes, that can be damaged by ESD events. To reduce the likelihood of damage to sensitive components, some examples of the disclosure reduce the parasitic capacitance between sensitive conductive paths and reference ground paths of the input device that could otherwise provide ESD paths to earth ground. In some examples, parasitic capacitance can be reduced by adding shielding, arranging current limiting resistance at specific locations among sensitive components, creating physical separation between sensitive conductive paths and reference ground paths, or adding high dielectric breakdown material.

Figure 1A:
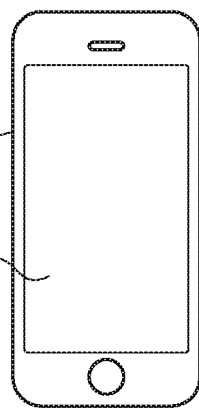
FIGS. 1A-1E illustrate example systems that can receive input from ESD-robust input devices according to examples of the disclosure.
Figure 1B:
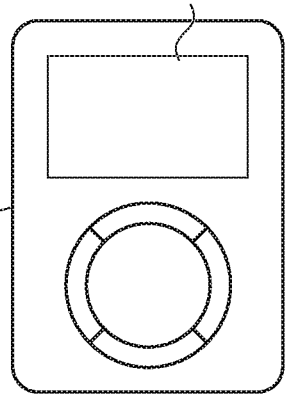
Figure 1C:
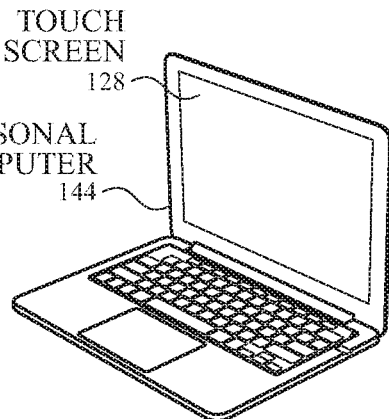
Figure 1D:
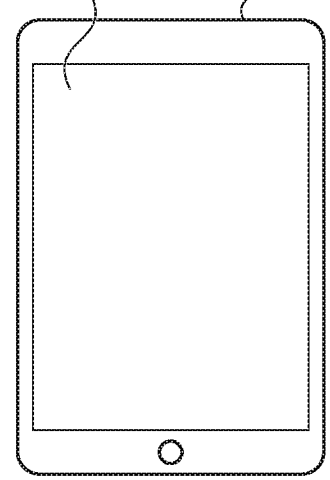
Figure 1E:
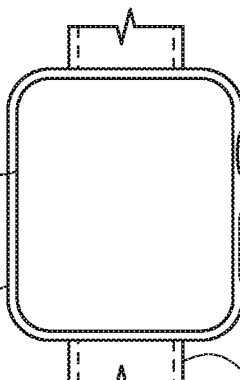

FIGS. 1A-1E illustrate example systems that can receive input from an ESD-robust handheld input device according to examples of the disclosure. FIG. 1A illustrates an example mobile telephone 136 that includes a touch screen 124 that can receive input from an ESD-robust input device according to examples of the disclosure. FIG. 1B illustrates an example digital media player 140 that includes a touch screen 126 that can receive input from an ESD-robust input device according to examples of the disclosure. FIG. 1C illustrates an example personal computer 144 that includes a touch screen 128 that can receive input from an ESD-robust input device according to examples of the disclosure. FIG. 1D illustrates an example tablet computing device 148 that includes a touch screen 130 that can receive input from an ESD-robust input device according to examples of the disclosure. FIG. 1E illustrates an example wearable device 150 attachable to a user using a strap 152 and including a touch screen 132 that can receive input from an ESD-robust input device according to examples of the disclosure. It is understood that other devices can also receive input from an ESD-robust input device as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes. For example, a touch screen can include a plurality of touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

In some examples, touch screens 124, 126, 128, 130, and 132 can sense an active input device such as an active stylus. The active input device can produce a device signal that can capacitively couple to the touch electrodes of touch screen 124, 126, 128, 130, and 132 to be sensed by sense circuitry coupled to the touch electrodes. In some examples, a touch screen including touch node electrodes can determine the location of the stylus by determining which touch node electrodes detect the stylus signal. In other examples, touch screens 124, 126, 128, 130, and 132 can sense a passive input device such as a passive stylus that does not include a power supply. The passive stylus can include one or more conductive components that can capacitively couple to an electrode of the touch screen to produce or modify a received signal that is thereafter sensed by the electronic device. For example, a passive stylus may reduce the capacitive coupling between a drive line and a sense line of the touch-sensitive surface by also being capacitively coupled to the drive and sense lines, thereby modifying the signal sensed by the sense line, thus enabling the electronic device to detect the stylus. In some examples, a touch screen including row electrodes and column electrodes can determine the location of the stylus along the rows and along the columns to determine the location of the stylus on the touch screen. Touch screens can be configured to detect both passive conductive objects (e.g., fingers, passive styluses) and active styluses.

Figure 2:
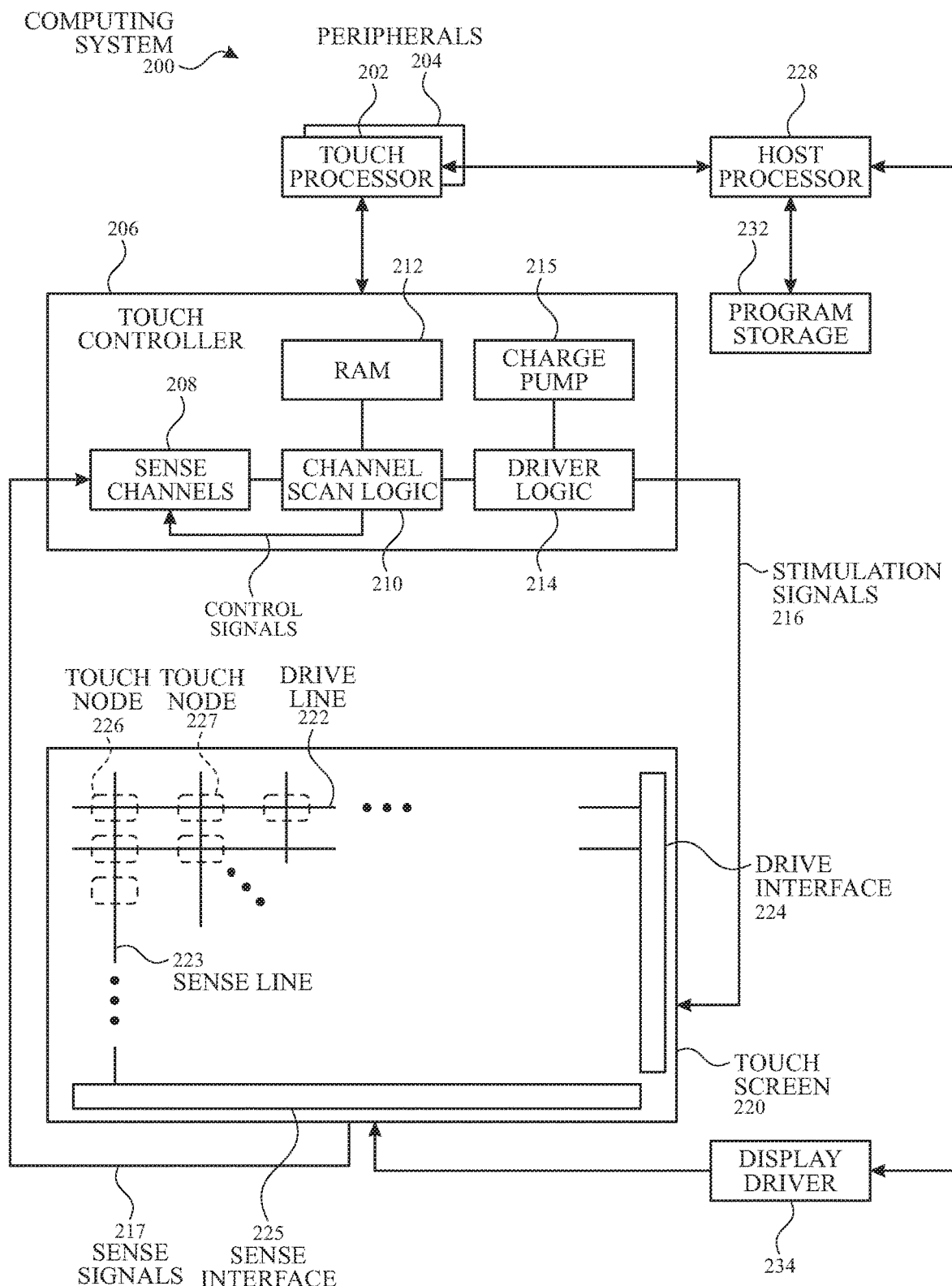
FIG. 2 illustrates an example computing system including a touch screen that can receive input from ESD-robust input devices according to examples of the disclosure.

FIG. 2 illustrates an example computing system including a touch screen that can receive input from an ESD-robust handheld input device according to examples of the disclosure. Computing system 200 can be included in, for example, a mobile phone, tablet, touchpad, portable or desktop computer, portable media player, wearable device or any mobile or non-mobile computing device that includes a touch screen. Although the example of FIG. 2 illustrates a touch screen, in other examples computing system 200 can be included in an electronic device employing a touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 (e.g., including one or more of sensing circuit 314), channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including multi-frequency stylus scans, can be performed by firmware stored in memory (e.g., one of the peripherals 204 in FIG. 2) and executed by touch processor 202 and/or touch controller 206, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive touch nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

In some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 3:
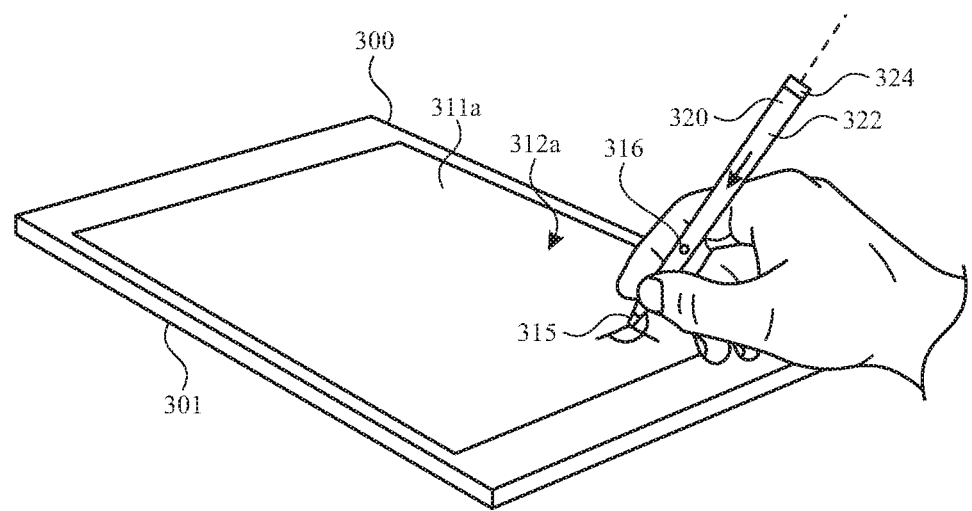
FIG. 3 illustrates an exemplary stylus and exemplary electronic device according to some examples of the disclosure.

FIG. 3 illustrates an exemplary system including a handheld input device 320 and an electronic device 300 according to some examples of the disclosure. A handheld input device 320 (e.g., a stylus, marking tool, smart pen, smart brush, wand, chisel, user-manipulated electronic input device, or any other suitable accessory, such as a glove) may be configured to provide input to electronic device 300 (e.g., a tablet computer, laptop computer, desktop computer, and the like) when the handheld input device 320 is proximate to (in contact with, or in proximity to) a surface of the electronic device. (Although the term "stylus" is primarily used hereinbelow for convenience, it should be understood that any reference to the term "stylus" is inclusive of other handheld input devices such as those listed above.) A system user may manipulate the orientation and position of stylus 320 relative to a surface of a touch-sensitive display or panel of electronic device 300 to convey information to electronic device 300, such as, but not limited to, writing, sketching, scrolling, gaming, selecting user interface elements, moving user interface elements, and so on. In some examples, the surface of the touch-sensitive display of electronic device 300 may be a multi-touch display screen. However, in some examples, the surface of the touch-sensitive display of electronic device 300 may be a non-display surface of the touch-sensitive display, such as, but not limited to, a trackpad or drawing tablet. The touch-sensitive surface may be a foldable or flexible panel or display. Electronic device 300 may be used to capture free-form user input from stylus 320. For example, the user can slide, move, draw, or drag a tip of stylus 320 across the surface of the touch-sensitive display of electronic device 300, which, in response, may render a graphical object (e.g., a line) using a display positioned below the surface of the touch-sensitive display. In such an example, the rendered graphical object may follow or otherwise correspond to the path of stylus 320 across the surface of the touch-sensitive display of electronic device 300. The thickness and/or shape and/or intensity and/or any other suitable rendered characteristic of the rendered graphical object may vary based, at least in part, on one, some, or each of various characteristics, including, but not limited to, a force or speed with which the user moves stylus 320 across the surface of the touch-sensitive display, an angle of stylus 320 relative to the surface of the touch-sensitive display (e.g., the inclination of stylus 320 relative to a plane of the surface of the touch-sensitive display, a writing angle of stylus 320 relative to a horizontal writing line traversing the surface of the touch-sensitive display, etc.), a variable setting of a variable input component of stylus 320, which one of multiple tips of stylus 320 is interacting with the surface of the touch-sensitive display, a variable setting of an application running on electronic device 300 (e.g., a virtual drawing space application), and/or a combination thereof.

Electronic device 300 may be any portable, mobile, or hand-held electronic device configured to interact with stylus 320 for changing any suitable characteristic(s) of device 300 (e.g., any suitable graphical object input tool characteristics that may be utilized to render a graphical object) in response to manipulation of stylus 320 across a surface of the touch-sensitive display of electronic device 300. Alternatively, electronic device 300 may not be portable at all, but may instead be generally stationary. Electronic device 300 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), merchant accessory (e.g., signature pad (e.g., as may be used in a check-out line of a merchant store during payment processing)), monitor, television, stereo equipment, set up box, set-top box, wearable device (e.g., watch, clothing, etc.), boom box, modem, router, printer, and combinations thereof. Electronic device 300 may include one or more components described above with reference to FIG. 2 (e.g., electronic device 300 can be the same as electronic device 200).

In the example of FIG. 3, a user can manipulate the orientation and position of stylus 320 relative to surface of the touch-sensitive display input component (e.g., a particular input component) of electronic device 300 in order to convey information to electronic device 300. Electronic device 300 may be configured to perform or coordinate multiple operations such as, but not limited to, locating stylus 320, estimating the angular position of stylus 320, estimating the magnitude of force by stylus 320 to surface of the touch-sensitive display, determining a variable setting of a variable input component of stylus 320, determining a variable setting of an application running on electronic device 300 (e.g., a virtual drawing space application), and/or a combination thereof. The electronic device 300 can perform these and other operations at the same time or at different times.

As shown in FIG. 3, the user can grip a barrel or handle or body portion 322 of stylus 320 extending between a front tip portion 315 of stylus 320 and a rear tip portion 324 of stylus 320. The user may interact with the electronic device 300 by sliding a tip portion, such as tip portion 315, of stylus 320 across surface of the touch-sensitive display of electronic device 300. As shown in FIG. 3, for example, device 300 can be a tablet computing device. It should be understood that many other electronic devices (with or without displays positioned below a stylus surface of the touch-sensitive display), such as any of the electronic device described above with reference to FIGS. 1A-1E, can be used to detect stylus 320. For example, the electronic device can be implemented as a peripheral input device, a trackpad, a drawing tablet, and the like.

In some examples, stylus 320 may have a general form of a writing instrument, such as a pen or a pencil-like structure with a cylindrical body 322 with two ends, such as a first end terminated at front portion 315 and a second end terminated at rear portion 324. One or more of portions 315 and 324 can be removable, affixed to body 322, or an integral part of body 322. In some examples, other input devices with different form factors are possible.

The stylus 320 can include one or more input or output components, which can be located at one or more of portions 315-324 of stylus 320. These components can include a button, a dial, a slide, a force pad, a touch pad, audio component, haptic component and the like. As one example, at least a portion of a simple mechanical switch or button input component that may be manipulated by the user for adjusting a variable setting of stylus 320 can be located at aperture 316. In some examples, stylus 320 can operate in a first mode when such an input component is manipulated in a first way and in a second mode when such an input component is manipulated in a second way.

Rear portion 324 of stylus 320 may provide a cosmetic end to body 322. Rear portion 324 may be formed integrally with body 322. In some examples, rear portion 324 may be formed similarly to front portion 315. For example, rear portion 324 may provide another tip feature for interacting with a surface of the touch-sensitive display of device 300 (e.g., stylus 320 may be flipped over by the user to drag portion 324 across surface of the touch-sensitive display of electronic device 300 rather than portion 315, which may enable different interactions with device 300). In some examples, rear portion 324 may include a switch or button or any other input component that may be manipulated by the user for adjusting a setting of stylus 320.

Tip portion 315 of stylus 320 may be configured to contact or nearly contact surface of the touch-sensitive display of device 300, allowing the user to use the stylus 320 to interact with the device 300. In some examples, tip 315 can include a tapered end or point, similar to a pen, which can enable the user to more precisely control stylus 320 and provide a familiar form factor. In some examples, tip 315 may be blunt or rounded, may take the form of a rotatable or fixed ball, or may have another shape. Tip 315 can include a material that can be softer than a material of the surface of the touch-sensitive display. For example, tip 315 can include a silicone, a rubber, a fluoro-elastomer, a plastic, a nylon, conductive or dielectric foam, a brass or metal ball with a polymer coating or dielectric coating (e.g., a thin coating with a high dielectric constant) or any other suitable coating, or any other suitable material or combination of materials that does not cause damage to the surface of the touch-sensitive display or layers applied to surface of the touch-sensitive display when the stylus 320 is in use.

A stylus may not include a power supply (e.g., battery or wired powered supply), and therefore may not be operative to generate any stylus electric field independently (e.g., without being stimulated by an external stimulus). Instead, a stylus may be provided with limited stylus I/O circuitry that may be operative to be stimulated by an external stimulus, such as a device stimulus that may be generated by device I/O circuitry of device I/O interface 311a of electronic device 300 (e.g., a touch-sensitive display). The device stimulus may be operative to stimulate the stylus I/O circuitry when located proximate to device I/O interface 311a. The stimulation of the stylus I/O circuitry may be operative to generate a suitable stylus electric field that may then be detected by device 300 for estimating the location of the stylus. The stylus electric field that may be distinguishable by device 300 from an electric field that may be provided by a user's direct contact with device I/O interface 311a.

Figure 4:
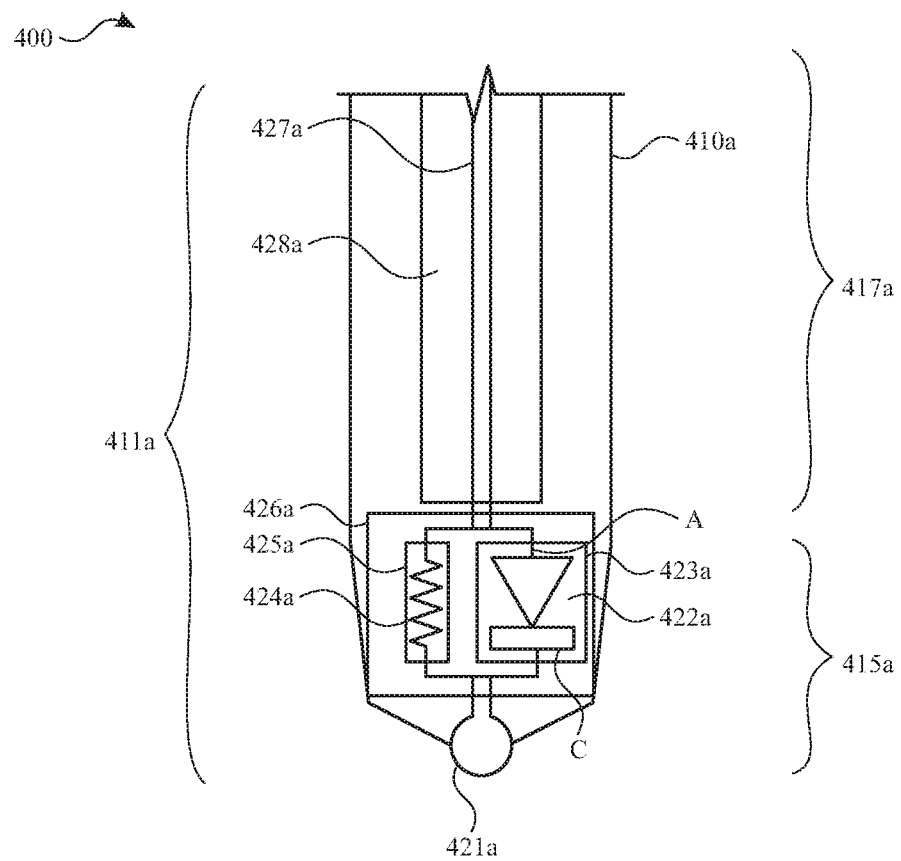
FIG. 4 illustrates an exemplary stylus according to some examples of the disclosure.

For example, FIG. 4 illustrates an exemplary stylus 400 according to some examples of the disclosure. In some examples, stylus 400 may include stylus I/O circuitry 411a. Stylus I/O circuitry 411a may operate in response to external stimulus, such as a drive signal generated by an electronic device (e.g., electronic device 136, 140, 144, 148, 150, 200, or 300). As shown by FIG. 4, for example, stylus 400 may include body portion 417a extending between a front tip portion 415a and a rear tip portion (not shown), where body portion 417a may be configured to be held by user to interact with an electronic device.

In some examples, body stylus circuitry 427a may be electrically coupled to front tip stylus circuitry 426a and/or to rear tip stylus circuitry (not shown). Body stylus circuitry 427a may be any suitable circuitry that may be operative to be electrically coupled (e.g., capacitively coupled) to a user holding stylus 400 about at least a portion of body portion 417a. As shown in FIG. 4, for example, body stylus circuitry 427a may include conductive material extending along at least a portion of a length of body portion 417a of stylus 400, which may be insulated by any suitable insulation 428a. In some examples, body stylus circuitry 427a may include a conductive (e.g., copper) tape along a portion of body 417a, where such tape may be positioned under any suitable insulation, such as a finger pad of any suitable material. The stylus can include any suitable housing 410a, such as a plastic housing. In some examples, the housing 410a can include insulation 428a. In some examples, at least a portion of body stylus circuitry 427a may be at least partially exposed via housing 410a and/or insulation 428a, thereby enabling direct contact by a user.

In some examples, stylus I/O circuitry 411a can include a front tip interface component 421a that can be included in front tip portion 415a of the stylus 400. In some examples, front tip interface component 421a can include one or more of, silicone, rubber, fluoro-elastomer, plastic, nylon, conductive or dielectric foam, metal (e.g., brass with a dielectric or polymer coating (e.g., a thin coating with a high dielectric constant)), or any other suitable material or combination of materials. The conductive material of front tip interface component 412a may be referred to herein as a tip electrode. By using such materials for the front tip interface, contact and movement of front tip interface component 421a across surface of the touch-sensitive display of electronic device 300 should not damage surface of the touch-sensitive display or layers applied to surface of the touch-sensitive display. In some examples, front tip interface component 421a can be removably attached to body 417a, such as via threadings/screws, detents and/or recesses, interference-fit or snap-fit, magnetic attraction, and the like.

Front tip stylus circuitry 426a may be positioned between and electrically coupled to front tip interface component 421a and body stylus circuitry 427a. Front tip stylus circuitry 426a can provide a non-linear load between body stylus circuitry 427a and front tip interface component 421a. In some examples, the front tip interface component 421a of stylus 400 may be stimulated by a signal that can be generated by device I/O circuitry of device I/O interface 311a of electronic device 300. For example, front tip stylus circuitry 426a may include any suitable non-linear electrical circuitry 423a that may be electrically coupled (e.g., in series) between front tip interface component 421a and body stylus circuitry 427a. For example, the non-linear circuitry 423a of stylus 400 can include at least one diode 422a, such as a Schottky diode. As shown in FIG. 4, an anode A of diode 422a may be electrically coupled to body stylus circuitry 427a and a cathode C of diode 422a may be electrically coupled to front tip interface component 421a. It should be understood, however, that it is possible to orient the diode 422a in the opposite way (e.g., connecting the anode A to the front tip interface component 421a). In some examples, the stylus 400 can include any suitable number (e.g., one or two or three or four or more) of diodes 422a. The diodes can be coupled together in series (e.g., a cathode of one diode may be coupled to an anode of a next diode) or in parallel.

Device I/O circuitry of I/O interface 311a of an electronic device 300 may provide a drive signal that can stimulate front tip interface component 421a of stylus 400 when it is proximate to or touching the surface of the touch-sensitive display of I/O interface 311a. In some examples, the drive signal can be capacitively coupled to the front tip interface component 421a of the stylus 400. A non-linear response from the stylus 400 can be transmitted via front tip interface component 421a to one or more sense electrodes of the electronic device 300, enabling the electronic device 300 to detect and locate the stylus 400.

In some examples, circuitry 426a may also include (e.g., in parallel with non-linear electrical circuitry 423a) any suitable resistance circuitry 425a (e.g., at least one resistor 424a). Resistor 424a can control reverse leakage current of non-linear electrical circuitry 423a and/or prevent direct current ("DC") positive voltage build up at the diode by, for example, draining off any DC while maintaining non-linearity of circuitry 426a. The resistance of resistor 424a may be selected in any suitable manner, such as by using a model of the panel, including its stimulation voltage and capacitance to the tip, and a model of the non-linear device. As an example, when using one or more Schottky diodes for non-linear electrical circuitry 423a, the resistance of resistor 424a can be in the range of 1-30 MΩ. In some examples, the resistance of resistor 424a can be in the range of 5-15 MΩ. In some examples, the resistance of resister 424a can be in the range of 4-6 MΩ.

In some examples, non-linear electrical circuitry 423a, may modulate and rectify a voltage on front tip interface component 421a and may provide a load (e.g., a capacitance of front tip interface component 421a) and resistance circuitry 425a, such as resistor 424a, and may be used to discharge the capacitance and/or to prevent capacitance from charging up. In some examples, a high performance and/or low capacitance and/or low voltage Schottky diode (e.g., on an insulating substrate) may be used. As another example, a diode may be made of any suitable material(s), including, but not limited to gallium arsenide and/or titanium nitride, which may have a large reverse leakage, but such leakage may be appropriately managed by resistance circuitry 425a. In some embodiments, a diode can be configured to have a current-voltage characteristic (e.g., an I-V curve) with certain properties, including, but not limited to, one with an abrupt or substantially abrupt non-linearity at a predetermined voltage and one that may maintain that voltage by balancing forward and reverse characteristics. In some examples, the materials of the diode can be selected to achieve desired performance characteristics.

Figure 5:
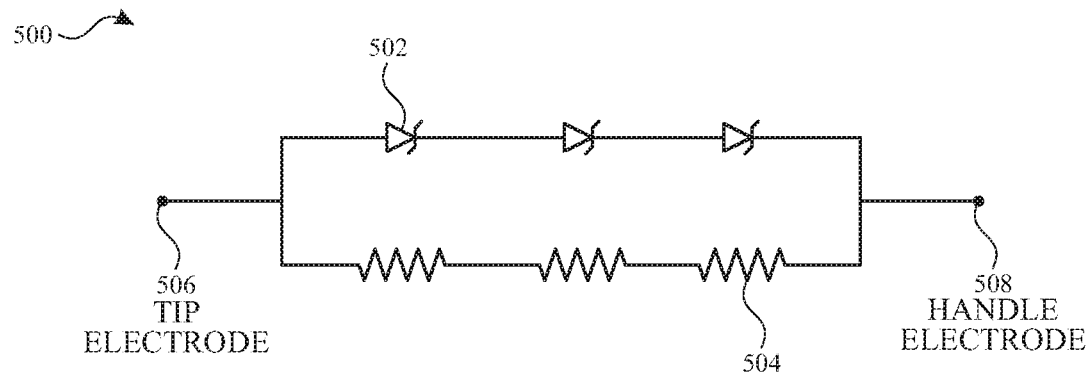
FIG. 5 illustrates a schematic diagram of front tip stylus circuitry according to some examples of the disclosure.

FIG. 5 illustrates a schematic diagram of front tip stylus circuitry 500 according to some examples of the disclosure. As discussed above, front tip stylus circuitry 500 can include a plurality of diodes 502 such as Schottky diodes in first, second and third component positions (as viewed from left to right) connected in series, and can include resistance circuitry such as a plurality of resistors 504 in first, second and third component positions connected in series. The plurality of series diodes 502 can be in parallel with the plurality of series resistors 504. This circuit configuration can generate harmonics (e.g., $2^{nd}$ harmonics) of a stimulation signal received from a proximate electronic device, which can then be detected by the electronic device. However, unlike the front tip stylus circuitry of FIG. 4, in the example of FIG. 5 the diodes are oriented with their anodes to the left (toward tip electrode 506) and cathodes to the right (toward handle electrode 508). For example, the anode of the diode in the first component position is connected to tip electrode 506 disposed at a tip end of the stylus, while the cathode of the diode in the third component position is connected to handle electrode 508. Handle electrode 508 can be coupled to, or otherwise formed within, a housing of the stylus and can serve as a reference ground for the stylus, and in some examples can extend along most of the length of the stylus. In some examples, handle electrode 508 can be covered by a material such as a low or high dielectric breakdown strength material. Handle electrode 508 can be capacitively coupled to a user's hand through the material. In some examples, handle electrode 508 can be directly coupled to a user's hand (e.g., via direct contact by a user to an exposed portion of handle electrode 508). Resistors 504 can be "bleed" resistors that can control the reverse leakage current of diodes 502 and prevent a DC voltage buildup at the diodes by draining off any DC voltage while maintaining the nonlinearity of the diodes.

Figure 6A:
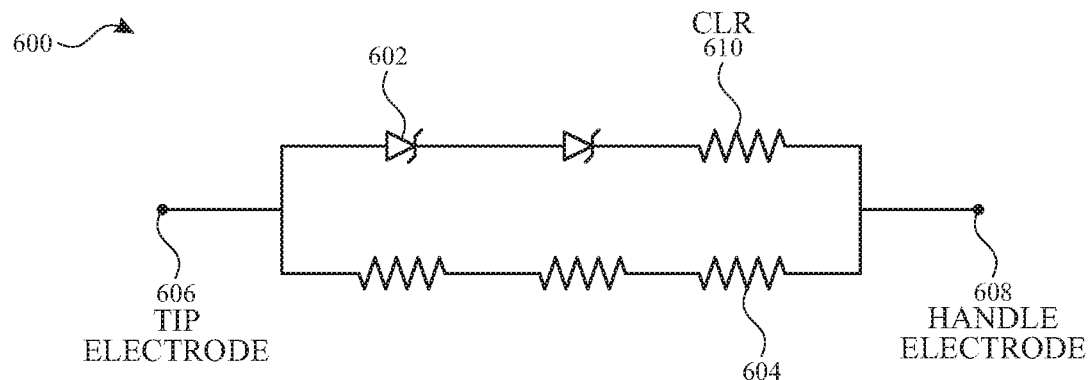
FIG. 6A illustrates a schematic diagram of front tip stylus circuitry with a current limiting resistance network according to some examples of the disclosure.

FIG. 6A illustrates a schematic diagram of front tip stylus circuitry 600 with a current limiting resistance (CLR) network 610 according to some examples of the disclosure. As mentioned above, some sensitive components, such as diodes 502 of FIG. 5, can be damaged or destroyed if they are part of an electrostatic discharge path. To limit this damage, CLR network 610 can be placed in series with diodes 602 in the sensitive component path. The example of FIG. 6A shows only two Schottky diodes 602 in first and second component positions and CLR 610 in the third component position, connected in series and also connected in parallel with three bleed resistors 604, but in other examples more or fewer diodes and resistors may be employed. Although FIG. 6A illustrates only a single resistor for CLR 610, it should be understood that the representation of the CLR in FIG. 6A is only symbolic, and that the CLR can be formed of a single resistor, or multiple resistors or resistive elements in various circuit network configurations. For example, a network of four resistors (two in series, connected in parallel with another two in series) can be employed to provide robustness and redundancy in view of possible damage or degradation due to ESD passing through the network.

Figure 6B:
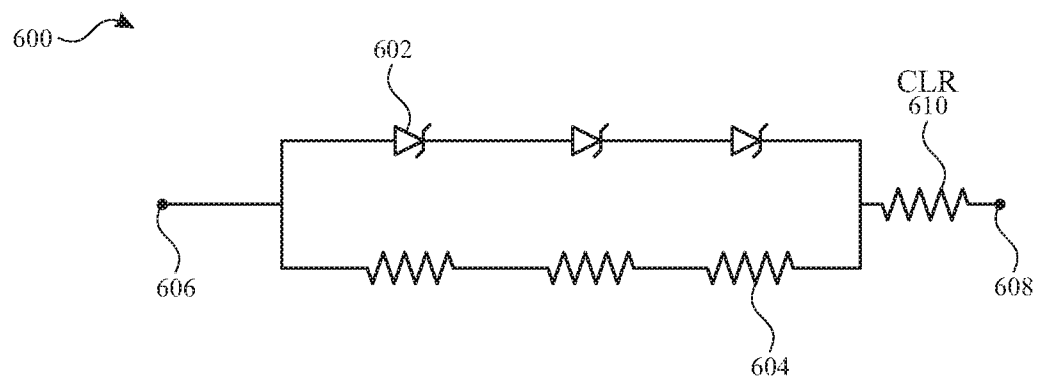
FIG. 6B illustrates a schematic diagram of front tip stylus circuitry with a current limiting resistance network in a different location as compared to FIG. 6A according to some examples of the disclosure.

FIG. 6B illustrates a schematic diagram of front tip stylus circuitry 600 with CLR network 610 in a different location according to some examples of the disclosure. In the example of FIG. 6B, three Schottky diodes 602 in first, second and third component positions are connected in parallel with bleed resistors 604, and CLR 610 is connected in series with the parallel configuration, though more or fewer diodes and resistors may be employed.

Figure 7A:
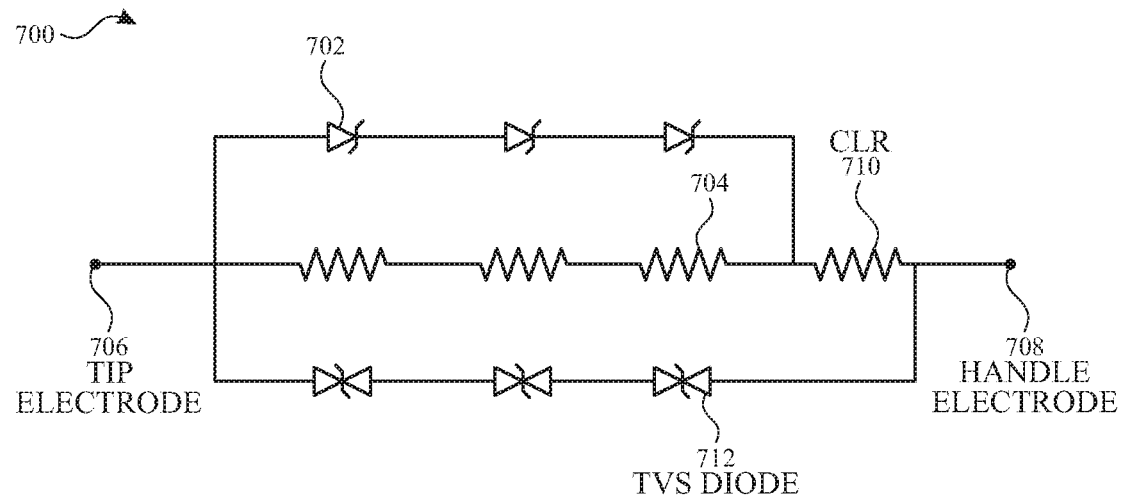
FIG. 7A illustrates a schematic diagram of front tip stylus circuitry with transient voltage suppression diodes according to some examples of the disclosure.

FIG. 7A illustrates a schematic diagram of front tip stylus circuitry 700 with transient voltage suppression (TVS) diodes 712 according to some examples of the disclosure. In the example of FIG. 7A, a plurality of bidirectional TVS diodes 712 can be connected in parallel with the circuit of FIG. 6B. Although only three TVS diodes 712 are shown in FIG. 7A, more or fewer diodes may be employed. TVS diodes 712 can shunt excess current when an induced voltage (such as from an ESD event) exceeds the avalanche breakdown potential of the TVS diodes, effectively clamping the voltage to the breakdown voltage. TVS diodes 712 can provide a least impedance path for ESD events, so that current entering from tip electrode 706 passes through the TVS diodes instead of Schottky diodes 702, thereby protecting the Schottky diodes. In operation, CLR 710 can protect Schottky diodes 702 until TVS diodes 712 reach their breakdown voltages and start conducting.

Figure 7B:
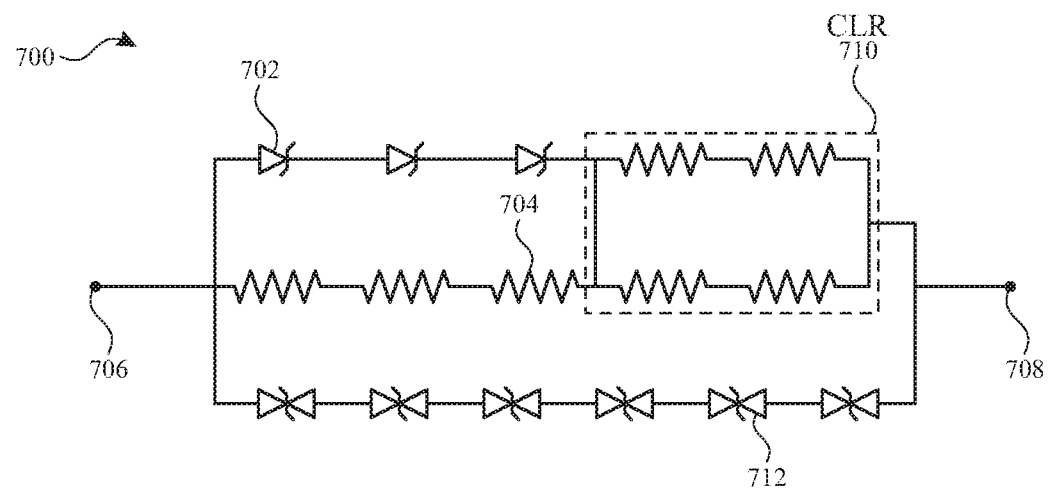
FIG. 7B illustrates a schematic diagram of front tip stylus circuitry with another transient voltage suppression diode and current limiting resistance network configuration according to some examples of the disclosure.

FIG. 7B illustrates a schematic diagram of front tip stylus circuitry 700 with another TVS diode 712 and CLR network 710 configuration according to some examples of the disclosure. In the example of FIG. 7B, CLR 710 is configured as a network of four resistors (two in series, connected in parallel with another two in series), and six TVS diodes 712 are employed. As with the preceding figures, more or fewer Schottky diodes, CLR resistors, bleed resistors and TVS diodes may also be employed.

The human body can accumulate charge and create ESD, but the resistance of the human body can control the frequency content of ESD current and can limit ESD events to relatively low frequencies. Because of these frequency limitations, the values and characteristics of the components in front tip stylus circuitry 700 of FIGS. 7A and 7B can be selected to protect against ESD events caused by a user. However, high-frequency ESD events can also be generated. For example, when metallic objects and insulative objects such as plastic comingle and rub against each other (such as in a backpack, purse or pocket), the insulative objects can cause a buildup of charge on the metallic objects. If these metallic objects come into contact (or close proximity) to the tip electrode of a stylus, high frequency ESD events (e.g., in a range of approximately 3 GHz-6 GHz) can be generated (as compared to lower frequency ESD events (e.g., up to around 1 GHz) that can be generated from the human body). These high frequency ESD events can have characteristics such as frequency, voltage, duration, and rise/fall times that depend on factors such as the electron affinity of the materials, temperature and humidity. Non-linear circuits such as the previously discussed Schottky diodes can be particularly susceptible to these high frequency ESD events.

Figure 8A:
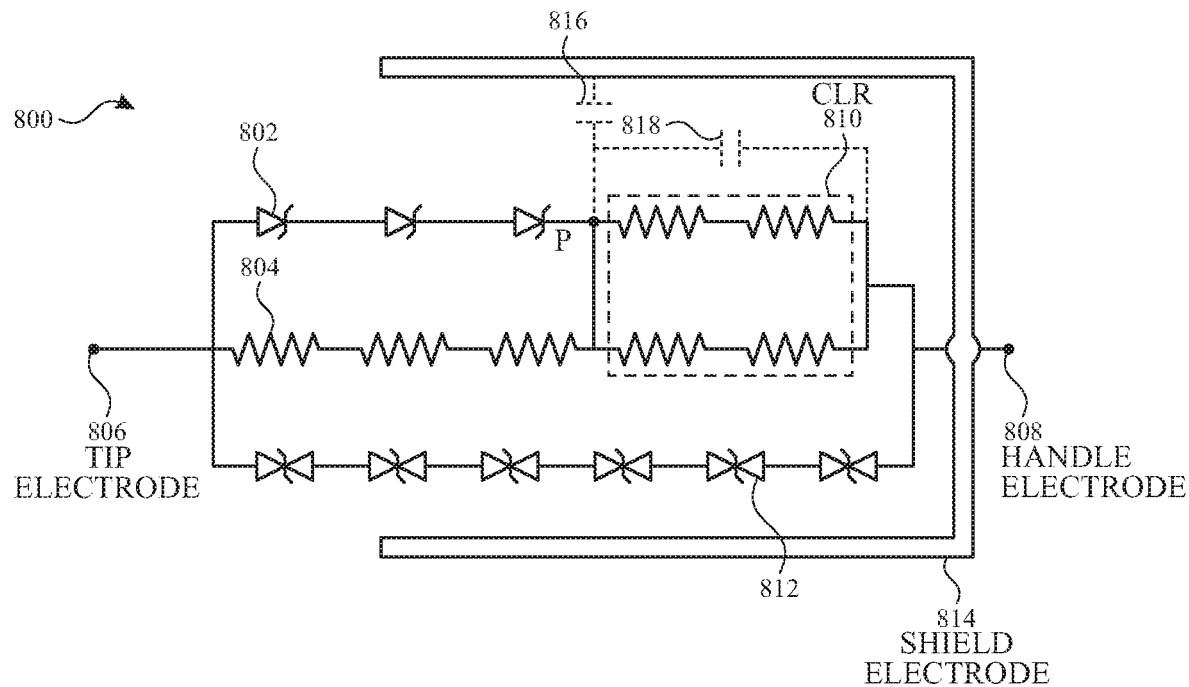
FIG. 8A illustrates a schematic diagram of front tip stylus circuitry and a shield electrode according to some examples of the disclosure.

FIG. 8A illustrates a schematic diagram of front tip stylus circuitry 800 and shield electrode 814 according to some examples of the disclosure. In the example of FIG. 8A, the circuit of FIG. 7B can be substantially surrounded by shield electrode 814, which is electrically connected to handle electrode 808 and can serve as the reference ground for the stylus. Although not evident in FIG. 8A, shield electrode 814 can substantially surround at least a portion of front tip stylus circuitry 800 on all sides but one (e.g., the shield electrode can be generally cylindrical in shape, or have other shapes that substantially surround at least a portion of the front tip stylus circuitry), with some or all of the side of the shield electrode facing tip electrode 806 being open to allow the tip electrode, circuit board and other components in the front tip stylus circuitry to enter the shielded area within the shield electrode. Because shield electrode 814 covers some or all of front tip stylus circuitry 800, it can protect the circuitry from ESD sources outside the stylus.

However, shield electrode 814 can also create undesirable ESD paths. For example, FIG. 8A illustrates parasitic capacitance 816 that can form between the left node or pad P of CLR 810 (from the perspective of FIG. 8A) and shield electrode 814 due to the proximity of pad P to the shield electrode. Parasitic capacitance 818 can also form between pad P of CLR 810 and the handle electrode 808. (Parasitic capacitances are illustrated with dashed lines herein.) Each of these parasitic capacitances can provide discharge paths for high frequency ESD pulses from tip electrode 806 that can bypass CLR 810 and its protection, resulting in possible damage to Schottky diodes 802. Therefore, it can be desirable to modify the circuit of FIG. 8A in a way that increases the likelihood that the high frequency current passes through CLR 810 and gets attenuated enough so that it does not cause permanent damage to Schottky diodes 802. Note that although parasitic capacitances 816 and 818 are specifically described herein and illustrated in FIG. 8A, it should be understood that other parasitic capacitances can form between other circuit nodes and components and shield electrode 814, although these are not shown in FIG. 8A or the following figures in order to simplify the figures.

Figure 8B:
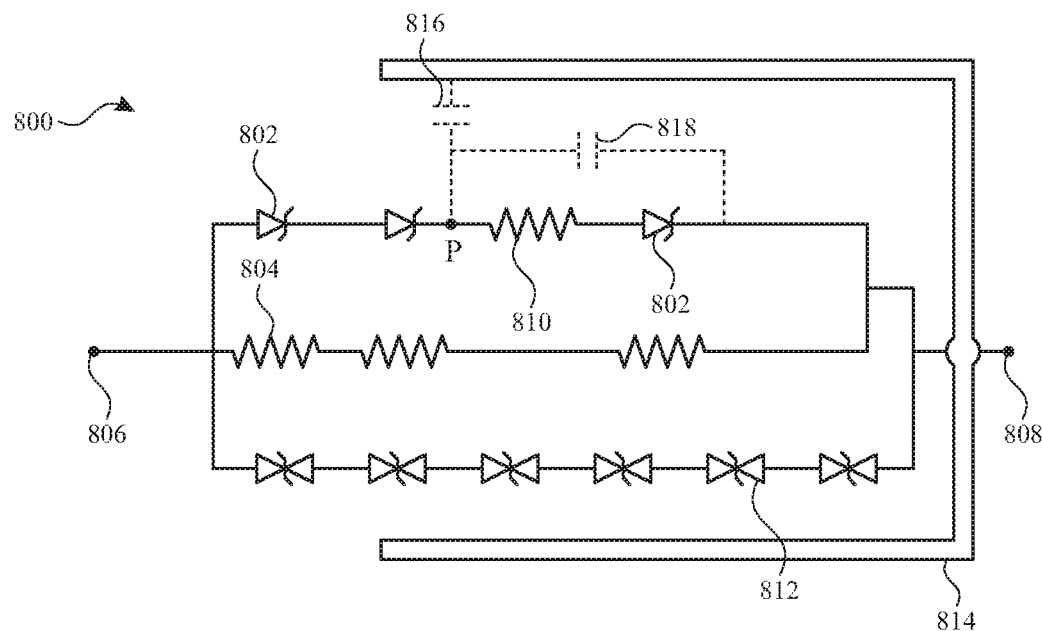
FIG. 8B illustrates a schematic diagram of front tip stylus circuitry and a shield electrode with a different placement of a current limiting resistance network as compared to FIG. 8A according to some examples of the disclosure.

FIG. 8B illustrates a schematic diagram of front tip stylus circuitry 800 and shield electrode 814 with a different placement of CLR 810 according to some examples of the disclosure. In the example of FIG. 8B, CLR 810 is located in the third component position instead of the fourth component position, while third Schottky diode 802 is located in the fourth component position instead of the third component position. Although FIG. 8B shows CLR 810 as a single resistor, in other examples the four resistor network of FIG. 8A or other resistive element configurations can also be employed. In some examples, the distance from pad P to tip electrode 806 can be between 7.5 to 10 mm, which increases the distance from pad P to handle electrode 808. During lower frequency ESD events, such as from the human body, the operation of Schottky diodes 802 and CLR 810 can remain essentially the same, despite the change in locations of the CLR and the third Schottky diode. That is, Schottky diodes 802 can effectively short-circuit during the lower-frequency ESD event, but can be protected by CLR 810, resulting in a voltage rise across the CLR. As a result, most of the current can flow through TVS diodes 812 and not through Schottky diodes 802.

Because CLR 810 is moved to the left in FIG. 8B, there is a greater distance between pad P of CLR 810 to handle electrode 808 as compared to FIG. 8A, and therefore a lower parasitic capacitance 818 can form between pad P and the handle electrode. Because of this lower parasitic capacitance, there can be a reduced chance that high frequency ESD pulses from tip electrode 806 will bypass CLR 810 and discharge across parasitic capacitance 818 to the handle electrode, causing damage to the Schottky diodes 802. Conversely, there can be an increased chance that high frequency ESD pulses from tip electrode 806 will pass through CLR 810 and sufficiently attenuate current flow so that it does not cause permanent damage to the Schottky diodes.

Figure 9:
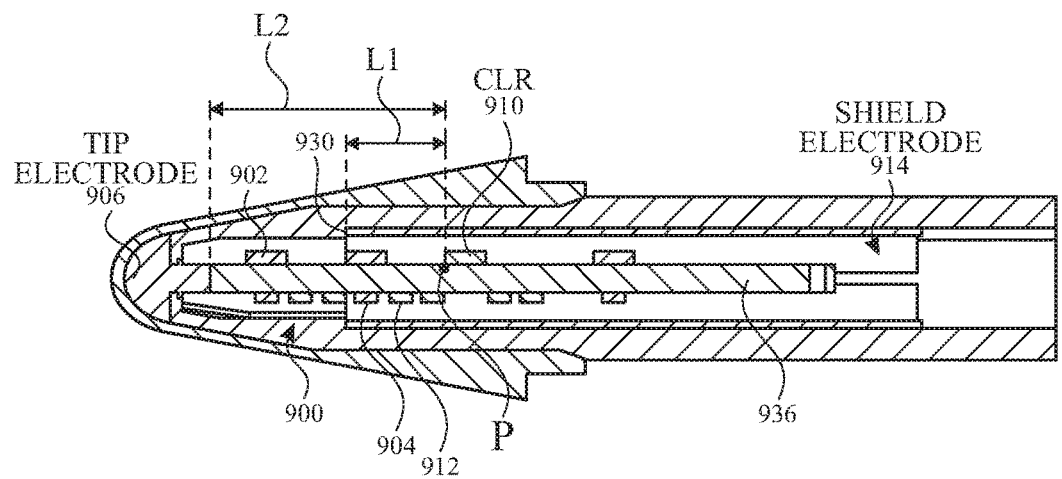
FIG. 9 illustrates a cross-sectional view of a portion of a stylus including front tip stylus circuitry and a shield electrode according to some examples of the disclosure.

FIG. 9 illustrates a cross-sectional view of a portion of a stylus including front tip stylus circuitry 900 and shield electrode 914 according to some examples of the disclosure. Shield 914 extends along a portion of the stylus, terminating at shield end 930 located closest to tip electrode 906. Note that Schottky diodes 902, bleed resistors 904, CLR 910 and TVS diodes 912 are illustrated symbolically on printed circuit board (PCB) 936 (e.g., with the bleed resistors 904 and TVS diodes 912 on a bottom side of PCB 936 and Schottky diodes 902 and CLR 910 on the top side of PCB 936). As discussed above, a parasitic capacitance can form between the left node or pad P of CLR 910 and shield electrode 914, based on the amount of overlap of the shield electrode and the components and traces in the sensitive component path. If the overlap (and therefore the parasitic capacitive coupling) between the sensitive component path and shield electrode 914 is large enough, the impedance of the parasitic capacitive coupling between pad P and shield electrode 914 can be low enough relative to the impedance of the CLR 910 that ESD current can discharge to the shield electrode rather than through the CLR as intended.

Moving CLR 910 towards tip electrode 906 can also reduce the overlap of the sensitive component path and shield electrode 914 and decrease the parasitic capacitive coupling between the sensitive components and the shield electrode. In the example of FIG. 9, CLR 910 is located in the third component position while the third Schottky diode 902 is located in the fourth component position, which is the same order as in FIG. 8B. FIG. 9 illustrates an example overlap of L1 (e.g., 2.6 mm) between pad P and shield end 930, which was selected based on a desired maximum parasitic capacitance of 150 femtoFarads (fF), and a distance between pad P and tip electrode 906 of L2. However, it should be understood that in other examples and for other desired parasitic capacitances, L1 and L2 can be different distances. In some examples, L1 can be between 1.6-2.6 mm to optimize overall performance and ESD robustness. In other examples, L1 can be less than 1.6 mm to provide acceptable parasitic capacitance for ESD purposes, but with reduced overall performance. This further reduction in parasitic capacitance due to reduced shield electrode overlap can reduce the chance that high frequency ESD pulses from tip electrode 906 will bypass CLR 910 and discharge to shield electrode 914, causing damage to Schottky diodes 902. Conversely, there can be an increased chance that high frequency ESD pulses from tip electrode 906 will pass through CLR 910 and sufficiently attenuate current flow so that it does not cause permanent damage to Schottky diodes 902.

In examples where the total parasitic capacitance between pad P and the shield and handle electrodes (which are electrically connected together and represent system ground) can have a requirement such as less than 147 fF, moving CLR 910 to the third component position can cause a reduction in the parasitic capacitance between pad P and the handle electrode (not shown in FIG. 9) from approximately 120 fF to approximately 13 fF, and a reduction of the parasitic capacitance between pad P and the shield electrode 914 from approximately 256 fF to approximately 134 fF. The total parasitic capacitance can therefore be reduced from approximately 376 fF to approximately 147 fF. In some examples, the parasitic capacitance can be within a range of 100 fF-150 fF to reduce the parasitic capacitance as much as possible without affecting other parameters. Moving CLR 910 to the third component position can also change the total impedance between pad P and the shield and handle electrodes at 1 GHz (representative of ESD from a human body) from 423 ohms to 1008 ohms, and can change the total impedance between pad P and the shield and handle electrodes at 6 GHz (representative of ESD from plastic-charged metallic objects) from 70 ohms to 180 ohms. Peak ESD current passing through Schottky diodes 902 can be reduced from about 6 amps to about 4 amps. In both instances, the higher impedance can discourage ESD events from discharging to the shield and handle electrodes instead of through CLR 910.

Figure 10:
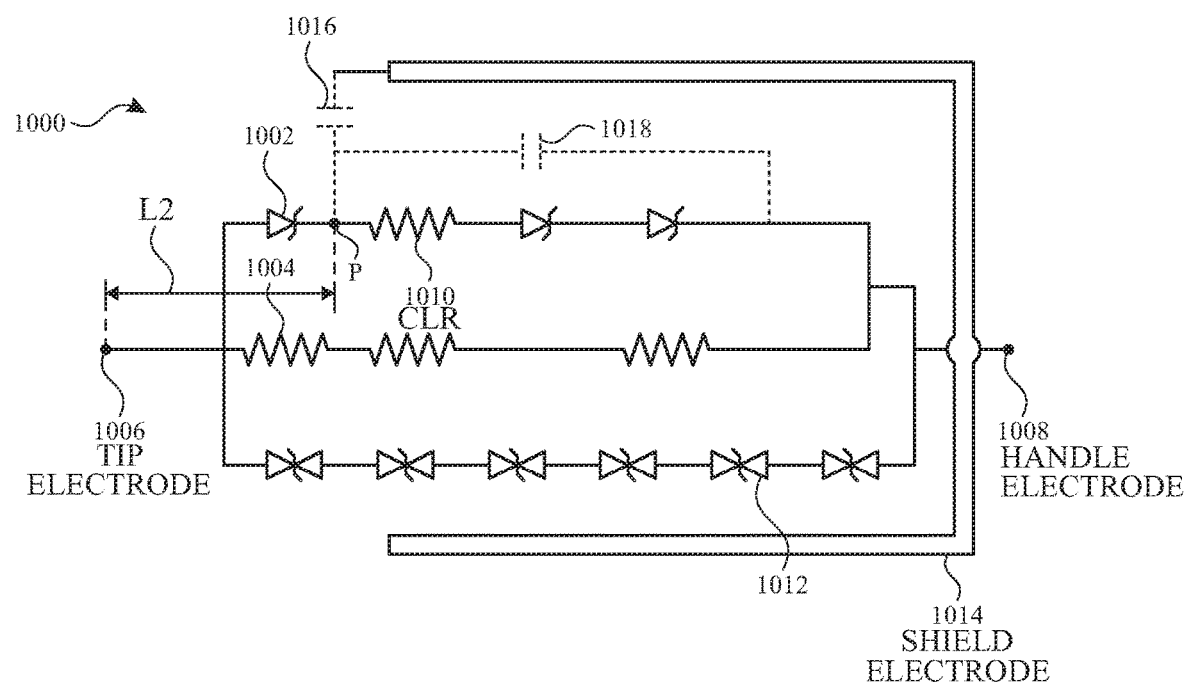
FIG. 10 illustrates a schematic diagram of front tip stylus circuitry and a shield electrode with yet another current limiting resistance network placement according to some examples of the disclosure.

FIG. 10 illustrates a schematic diagram of front tip stylus circuitry 1000 and shield electrode 1014 with yet another CLR 1010 placement according to some examples of the disclosure. In the example of FIG. 10, CLR 1010 is located in the second component position instead of the third component position (from left to right) as in FIG. 8B, while the second and third Schottky diodes 1002 are located in the third and fourth component positions, respectively. Although FIG. 10 shows CLR 1010 as a single resistor, in other examples the four resistor network of FIG. 8A or other resistive element configurations can also be employed. In some examples, the distance L2 from pad P to tip electrode 1006 can be about 6 mm, which increases the distance from pad P to the handle electrode 1008 even more as compared to FIG. 8B. In other examples, L2 can be about 5-6 mm to optimize overall performance and ESD robustness, and can even be smaller than 5 mm to provide acceptable parasitic capacitance for ESD purposes, but with reduced overall performance. During lower frequency ESD events, such as from the human body, the operation of Schottky diodes 1002 and CLR 1010 can remain essentially the same, despite the change in locations of the CLR and the Schottky diodes. That is, Schottky diodes 1002 can effectively short-circuit during the lower-frequency ESD event, but can be protected by CLR 1010, resulting in a voltage rise across the CLR. As a result, most of the current can flow through TVS diodes 1012 and not through Schottky diodes 1002.

Because CLR 1010 is moved further to the left in FIG. 10, there is a greater distance between pad P of CLR 1010 to handle electrode 1008 as compared to FIG. 8B, and therefore a lower parasitic capacitance 1018 can form between pad P and the handle electrode. Because of this lower parasitic capacitance, there can be a reduced chance that high frequency ESD pulses from tip electrode 1006 will bypass CLR 1010 and discharge across parasitic capacitance 1018 to the handle electrode, causing damage to Schottky diodes 1002. Conversely, there can be an increased chance that high frequency ESD pulses from tip electrode 1006 will pass through CLR 1010 and sufficiently attenuate current flow so that it does not cause permanent damage to Schottky diodes 1002.

In some examples, CLR 1010 can be located in the first component position (from left to right), while the first, second and third Schottky diodes 1002 can be located in the second, third and fourth component positions, respectively. In these examples, CLR 1010 can be a single resistor, the four resistor network of FIG. 8A, or other resistive element configurations. In some examples, the distance from pad P to tip electrode 1006 can be about 3.6 mm, which increases the distance from pad P to the handle electrode even more as compared to FIG. 10. In other examples, this distance can be about 1.8-3.6 mm based on the mechanical limitations of the circuit board design. This configuration can provide similar decreases in parasitic capacitance between pad P and handle electrode 1008, and can provide a similar advantage of increasing the likelihood that ESD current flows through CLR 1010 rather than discharging to shield electrode 1014 and bypassing CLR 1010.

Although the previous discussion and associated figures primarily describe and depict the front tip stylus circuitry only schematically as being located between the handle electrode and the tip electrode, without physical detail, in various product design examples the front tip stylus circuitry can be formed on one or more layers of a circuit board that may also include routing traces of a handle electrode net. The handle electrode net traces, in particular, which act as a reference ground for the stylus, can be routed in close proximity to sensitive components of the front tip stylus circuitry and can create parasitic capacitive coupling with those components, creating electrostatic discharge paths that bypass the CLR and put sensitive components such as Schottky diodes at risk.

Figure 11A:
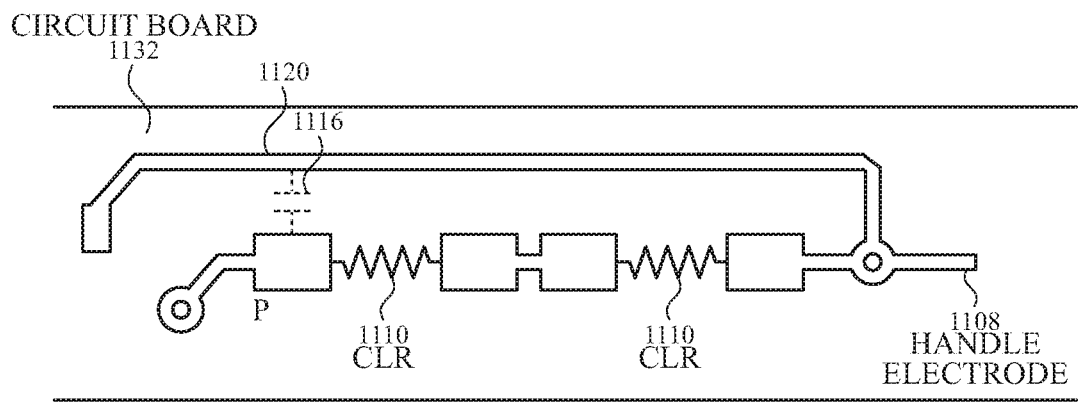
FIG. 11A illustrates a layout of current limiting resistor pads, a portion of a handle electrode net, and other routing traces on a circuit board according to some examples of the disclosure.

FIG. 11A illustrates a layout of current limiting resistor pads, a portion of a handle electrode net, and other routing traces on circuit board 1132 according to some examples of the disclosure. In the example of FIG. 11A, two representative CLRs 1110 are shown symbolically, installed on pads. Handle electrode 1108 is electrically connected to trace 1120 of a larger handle electrode net. Because of the close proximity of trace 1120 to pad P, parasitic capacitance 1116 can form between pad P and trace 1120. Parasitic capacitance 1116 can provide a discharge path for high frequency ESD pulses from the tip electrode that bypass CLRs 1110 and their protection, resulting in possible damage to the Schottky diodes (not shown in FIG. 11).

Figure 11B:
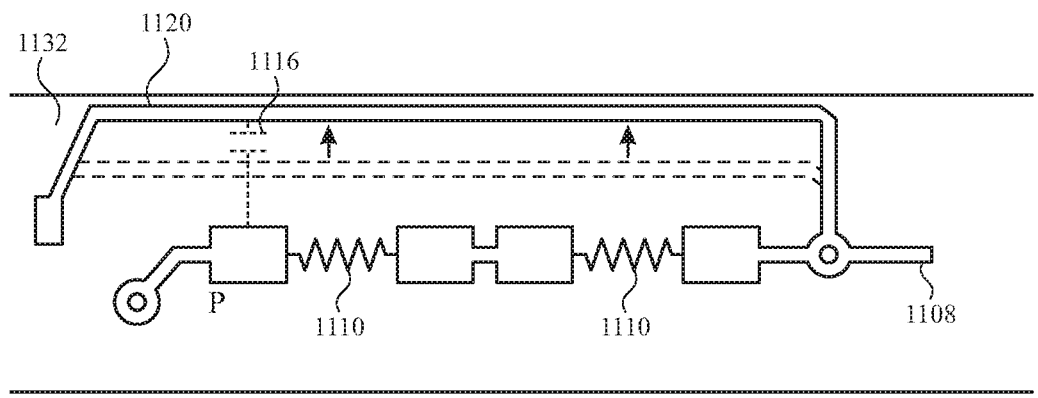
FIG. 11B illustrates a layout of current limiting resistor pads, revised routing of a portion of a handle electrode net, and other routing traces on a circuit board according to some examples of the disclosure.

FIG. 11B illustrates a layout of current limiting resistor pads, revised routing of a portion of a handle electrode net, and other routing traces on a circuit board according to some examples of the disclosure. In the example of FIG. 11B, trace 1120, which is part of the larger handle electrode net, is routed to be farther away from the sensitive component pads, including pad P, as compared to FIG. 11A (whose trace routing is shown in dashed lines in FIG. 11B for comparison; see arrows). In some examples, trace 1120 can be routed to an edge of circuit board 1132 on which it is formed. Because of the greater distance between trace 1120 and pad P as compared to FIG. 11A, a smaller parasitic capacitance 1116 can be formed between pad P and trace 1120 as compared to FIG. 11A. In some examples, approximately a 45% reduction in parasitic capacitance can be achieved. The smaller parasitic capacitance 1116 can make it less likely that high frequency ESD pulses from the tip electrode will discharge to handle electrode 1108 via trace 1120 and bypass CLRs 1110 and their protection, resulting in a decreased chance of damage to the Schottky diodes.

Figure 11C:
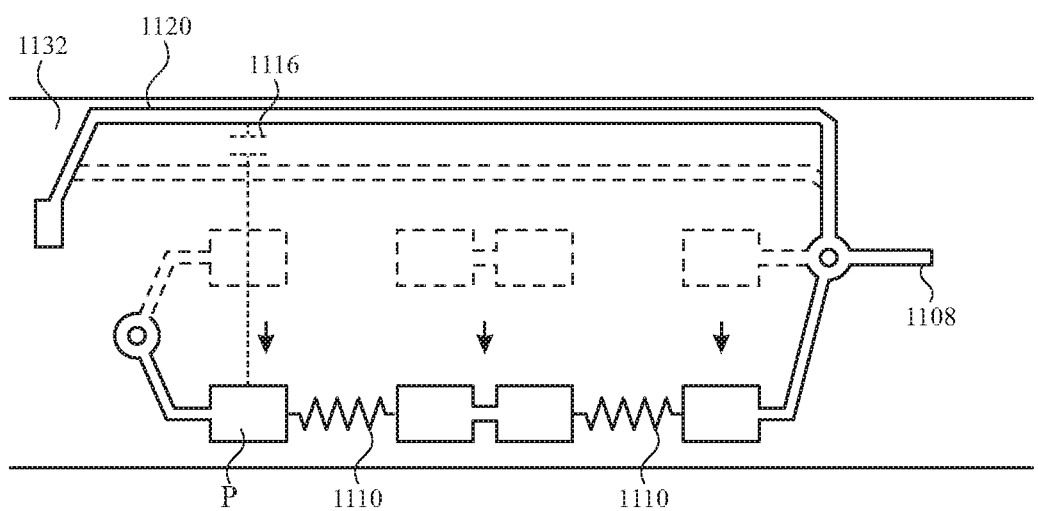
FIG. 11C illustrates a revised layout of current limiting resistor pads, revised routing of a portion of a handle electrode net, and other routing traces on a circuit board according to some examples of the disclosure.

FIG. 11C illustrates a revised layout of current limiting resistor pads, revised routing of a portion of a handle electrode net, and other routing traces on a circuit board according to some examples of the disclosure. In the example of FIG. 11C, the pads for CLRs 1110, including pad P, are laid out to be farther away from trace 1120 as compared to FIGS. 11A-B (whose pad layout is shown in dashed lines in FIG. 11C for comparison; see arrows). In some examples, the pads can be routed to an edge of circuit board 1132 on which it is formed. Because of the greater distance between trace 1120 and pad P as compared to FIG. 11B, a smaller parasitic capacitance 1116 can be formed between pad P and trace 1120 as compared to FIG. 11B. The smaller parasitic capacitance 1116 can make it less likely that high frequency ESD pulses from the tip electrode will discharge to handle electrode 1108 via trace 1120 and bypass CLRs 1110 and their protection, resulting in a decreased chance of damage to the Schottky diodes. In other examples not shown in FIG. 11C, trace 1120 can remain as shown in FIG. 11A, while the pads can be laid out to be farther away from the trace as shown in FIG. 11C.

As discussed above with respect to FIG. 9, a parasitic capacitance can form between the left node or pad P of the CLR (or other sensitive components or conductive areas) and the shield electrode, based on the amount of overlap of the shield electrode and the components and traces in the sensitive component path. If the overlap (and therefore the parasitic capacitive coupling) between the sensitive component path and the shield electrode is large enough, the impedance of the parasitic capacitive coupling path between pad P and the shield electrode can be low enough relative to the impedance of the CLR that electrostatic current can discharge to the shield electrode rather than through the CLR as intended, reducing or eliminating the effectiveness of the CLR and subjecting sensitive components such as the Schottky diodes to potential damage or destruction. However, increased parasitic capacitance between the shield electrode and a sensitive component or area, such as pad P, can occur for reasons other than increased shield electrode overlap. In some examples, close proximity of the shield electrode to sensitive components or areas such as pad P can also cause increased parasitic capacitance.

Figure 12A:
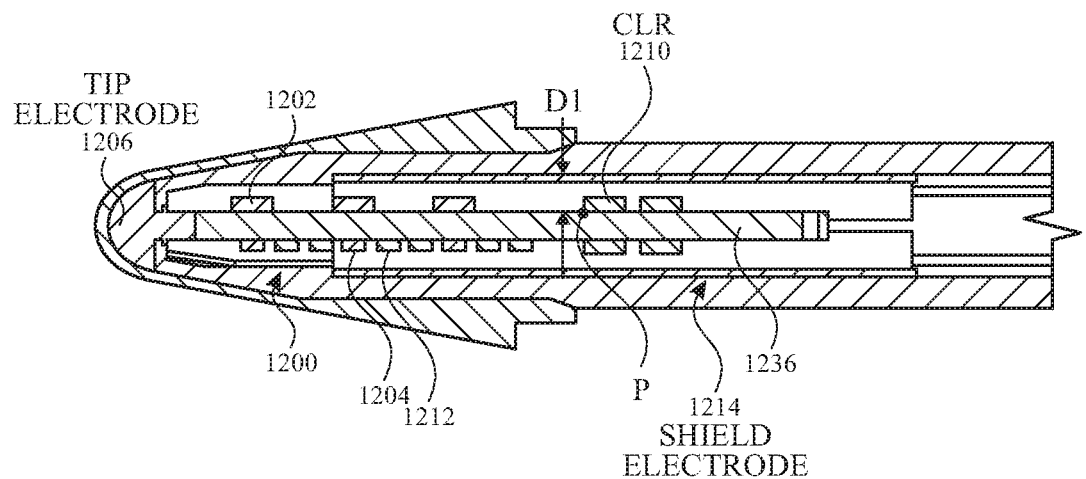
FIG. 12A illustrates a cross-sectional view of a portion of a stylus including front tip stylus circuitry and a shield electrode according to some examples of the disclosure.

FIG. 12A illustrates a cross-sectional view of a portion of a stylus including front tip stylus circuitry 1200 and shield electrode 1214 according to some examples of the disclosure. Note that Schottky diodes 1202, bleed resistors 1204, CLR 1210 and TVS diodes 1212 are illustrated symbolically on PCB 1236. Although the example of FIG. 12A illustrates CLR 1210 (represented symbolically by a pair of blocks on each side of a circuit board) located in the fourth component position (along the top of the circuit board), it should be understood that CLR 1210 can alternatively be located in the third, second or first component positions. In the example of FIG. 12A, the diameter of shield electrode 1214 results in a distance D1 between pad P and the shield electrode. If distance D1 is small enough, the parasitic capacitance between pad P and shield electrode 1214 can be large enough to create a discharge path to the shield electrode rather than through CLR 1210, as discussed above.

Figure 12B:
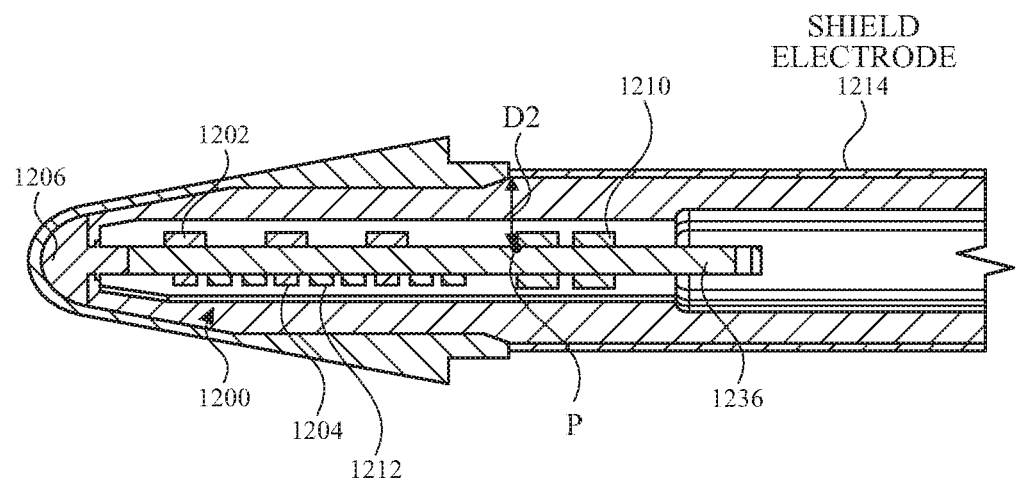
FIG. 12B illustrates a cross-sectional view of a portion of a stylus including front tip stylus circuitry and a different shield electrode structure as compared to FIG. 12A according to some examples of the disclosure.

FIG. 12B illustrates a cross-sectional view of a portion of a stylus including front tip stylus circuitry 1200 and a different shield electrode structure 1214 according to some examples of the disclosure. Note that Schottky diodes 1202, bleed resistors 1204, CLR 1210 and TVS diodes 1212 are illustrated symbolically on PCB 1236. Although the example of FIG. 12B illustrates CLR 1210 (represented symbolically by a pair of blocks on each side of a circuit board) located in the fourth component position (along the top of the circuit board), it should be understood that CLR 1210 can alternatively be located in the third, second or first component positions. In the example of FIG. 12B, shield electrode 1214 is located on an outside surface of the stylus housing, although in other examples the shield electrode can be located within the body of the stylus, but farther away from pad P than shown in FIG. 12A. The diameter of shield electrode 1214 results in a distance D2 between pad P and the shield electrode. In the examples of FIGS. 12A and 12B, D2 is greater than D1. If distance D2 is large enough, the parasitic capacitance between pad P and shield electrode 1214 can be small enough to not create a discharge path to the shield electrode. As a result, current from an ESD event is more likely to flow through the CLR, protecting the sensitive components.

In some examples of the disclosure, the location of shield electrode 1214 can be selected such that D2 is at least 2 mm or in a range of 2-4 mm. In other examples, the location of shield electrode 1214 can be selected such that the diameter of the shield electrode (when the shield electrode is cylindrical) is about 2.6 mm, which can produce a total parasitic capacitance between pad P and the shield electrode of about 147 fF. In other examples, the diameter can be about 3 mm for a total parasitic capacitance of about 138 fF, or about 3.4 mm for a total parasitic capacitance of about 130 fF, or about 3.8 mm for a total parasitic capacitance of about 114 fF.

Figure 13A:
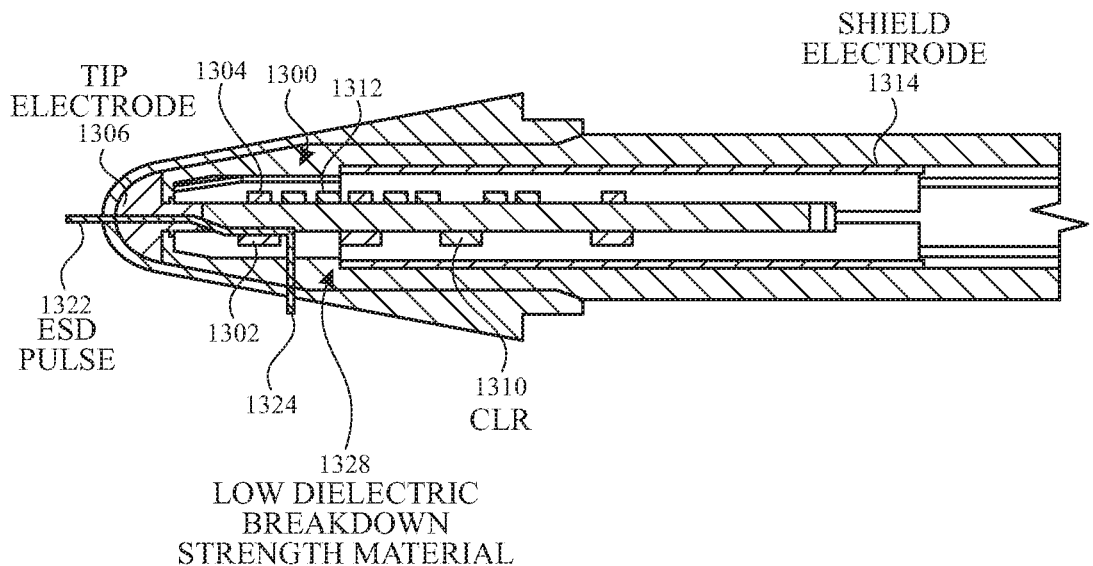
FIG. 13A illustrates a cross-sectional view of a portion of a stylus including front tip stylus circuitry and a discharge path outside of a shield electrode according to some examples of the disclosure.

FIG. 13A illustrates a cross-sectional view of a portion of a stylus including front tip stylus circuitry 1300 and discharge path 1324 outside of shield electrode 1314 according to some examples of the disclosure. Note that the example of FIG. 13A presents an inverted view (with Schottky diodes 1302 on the bottom of a circuit board and TVS diodes 1312 on the top of the circuit board) as compared with previous figures. Schottky diodes 1302, bleed resistors 1304, CLR 1310 and TVS diodes 1312 are illustrated symbolically. Although the example of FIG. 13A illustrates CLR 1310 (represented symbolically by a single block on one side of the circuit board) located in the third component position (along the bottom of the circuit board), it should be understood that CLR 1310 can alternatively be located in the fourth, second or first component positions. In the example of FIG. 13A, at least a front portion of the stylus is covered with a low dielectric breakdown strength material 1328 such as a thermoplastic elastomer (e.g., polyether block amide). When some ESD events occur, a low impedance path from tip electrode 1306 to the handle electrode (not shown in FIG. 13A) through TVS diodes 1312 can form, allowing the current to bypass critical components such as Schottky diodes 1302 and reducing the chance of damage to them.

However, in some instances when ESD pulse 1322 enters tip electrode 1306, it can exit the stylus at location 1324 through low dielectric breakdown strength material 1328 prior to passing within shield electrode 1314, and can discharge to an external object such as a conductive table. If ESD pulse 1322 passes through any sensitive components such as Schottky diode 1302 before exiting at location 1324 (bypassing CLRs or TVS diodes), those sensitive components can be damaged or destroyed.

Figure 13B:
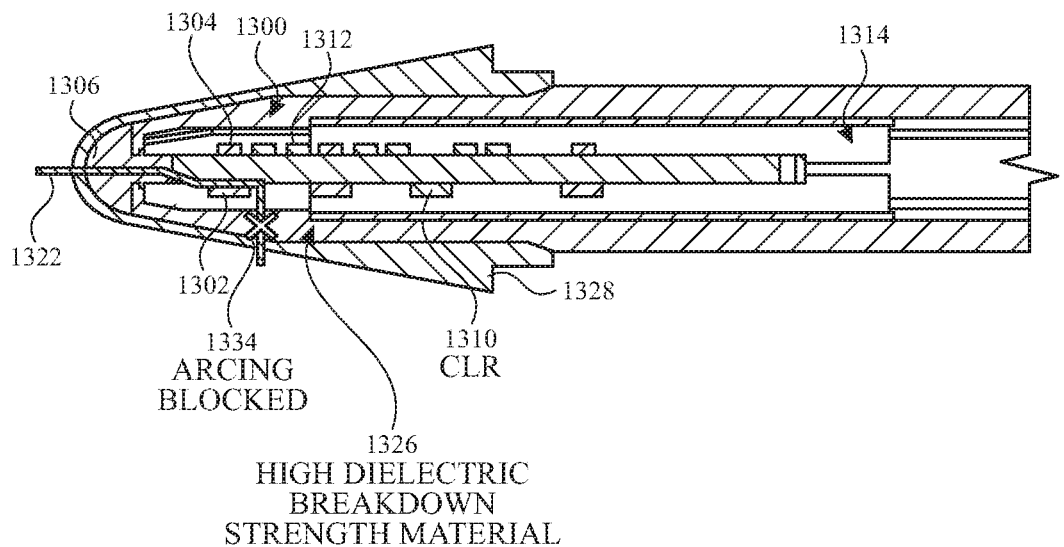
FIG. 13B illustrates a cross-sectional view of a portion of a stylus including front tip stylus circuitry employing high dielectric breakdown strength material according to some examples of the disclosure.

FIG. 13B illustrates a cross-sectional view of a portion of a stylus including front tip stylus circuitry 1300 employing high dielectric breakdown strength material 1326 according to some examples of the disclosure. Although the example of FIG. 13B illustrates CLR 1310 (represented symbolically by a single block on one side of a circuit board) located in the third component position (along the bottom of the circuit board), it should be understood that CLR 1310 can alternatively be located in the fourth, second or first component positions. In the example of FIG. 13B, at least a front portion of the stylus, located in an area without shield electrode 1314 (i.e., the area between tip electrode 1306 and the start of shield electrode 1314) is covered with high dielectric breakdown strength material 1326 such as Polyamide 11. High dielectric breakdown strength material 1326 can substantially surround all or at least a portion of the front tip stylus circuitry 1300 (e.g., high dielectric breakdown strength material 1326 can be generally cylindrical in shape, or have other shapes that substantially surround at least a portion of the front tip stylus circuitry), and can additionally cover other areas of the stylus, as shown in FIG. 13B. In other examples not shown in FIG. 13B, only the area between tip electrode 1306 and the start of shield electrode 1314 can be covered with high dielectric breakdown strength material 1326. In some examples, the dielectric breakdown strength of high dielectric breakdown strength material 1326 can be at least 800 volts/mil. If high dielectric breakdown strength material 1326 is the outward-facing material intended to contact a surface, a material that is soft, durable, thin, and having a sufficiently high dielectric breakdown strength can be used.

In the example of FIG. 13B, at least a tip portion of high dielectric strength material 1326 is covered with low dielectric breakdown strength material 1328 such as a thermoplastic elastomer (e.g., polyether block amide). In some examples (not shown in FIG. 13B), low dielectric breakdown strength material 1328 is absent, and the front portion of the stylus is covered only with high dielectric breakdown strength material 1326. In other examples (not shown in FIG. 13B), shield electrode 1314 can be absent, and instead high dielectric breakdown strength material 1326 can extend over areas of the front tip stylus circuitry that would otherwise have been covered by the shield electrode, and act as a replacement for the shield electrode.

When ESD pulse 1322 occurs, high dielectric breakdown strength material 1326 can prevent the pulse from discharging to an external object (see "X" 1334), and instead the current can follow a low impedance path from tip electrode 1306 to the handle electrode (not shown in FIG. 13A) through TVS diodes 1312, bypassing critical components such as Schottky diodes 1302 and reducing the chance of damage to them. The effectiveness of high dielectric breakdown strength material 1326 can depend on its total breakdown strength, which is a function of its thickness and its breakdown strength per unit distance. For example, if an ESD pulse having a peak current of 15 kV is to be expected, a material with a total dielectric breakdown strength greater than 15 kV can be chosen. The breakdown strength in volts/mm can determine the needed thickness of the material.

Although various examples of CLR placement, shield electrode placement and size, placement and routing of component pads and traces, and high dielectric breakdown strength materials may be described above in different paragraphs and shown in different figures for convenience of explanation, it should be understood that different permutations and combinations of these features are contemplated in different examples of the disclosure.

Therefore, according to the above, some examples of the disclosure are directed to an input device for providing input, comprising a housing, a tip electrode disposed at a tip end of the housing and configured for providing input to a proximate surface, a handle electrode coupled to the housing, and a plurality of diodes and a current limiting resistance network in a series connection between the tip electrode and the handle electrode, wherein at least one of the plurality of diodes is located between the current limiting resistance network and the handle electrode. As an alternative to or in addition to one more of the examples disclosed above, in some examples the series connection includes first, second, third and fourth component positions from the tip electrode to the handle electrode, and wherein the current limiting resistance network is located in the third component position. As an alternative to or in addition to one more of the examples disclosed above, in some examples the current limiting resistance network comprises first and second resistors connected in series, connected in parallel with third and fourth resistors connected in series. As an alternative to or in addition to one more of the examples disclosed above, in some examples the input device further comprises one or more resistors connected in series with each other and connected in parallel with at least the plurality of diodes. As an alternative to or in addition to one more of the examples disclosed above, in some examples the input device further comprises one or more voltage suppression diodes connected in series with each other and connected in parallel with at least the plurality of diodes and the current limiting resistance network. As an alternative to or in addition to one more of the examples disclosed above, in some examples the input device further comprises a shield electrode electrically coupled to the handle electrode and substantially surrounding at least a portion of the series connection of the plurality of diodes and the current limiting resistance network, the shield electrode terminating at a shield end located closest to the tip electrode. As an alternative to or in addition to one more of the examples disclosed above, in some examples the input device further comprises a first pad directly connected to the current limiting resistance network and electrically coupled between the current limiting resistance network and the tip electrode, wherein a location of the first pad and the current limiting resistance network within the series connection with respect to the handle electrode is selected to produce a total parasitic capacitance between the first pad and the shield and handle electrodes of less than 147 femtofarads. As an alternative to or in addition to one more of the examples disclosed above, in some examples the input device further comprises a first pad directly connected to the current limiting resistance network and electrically coupled between the current limiting resistance network and the tip electrode, wherein a location of the first pad and the current limiting resistance network within the series connection is selected to produce an overlap of the shield electrode between first pad and the shield end of between 1.6-2.6 mm. As an alternative to or in addition to one more of the examples disclosed above, in some examples the input device further comprises a circuit board, at least one pad for the current limiting resistance network formed on the circuit board, and at least one routing trace of the handle electrode formed on the circuit board, wherein at least a portion of the at least one routing trace of the handle electrode is formed along a first edge of the circuit board to reduce capacitive coupling between the handle electrode and the at least one pad. As an alternative to or in addition to one more of the examples disclosed above, in some examples the at least one pad is formed along a second edge of the circuit board opposite the first edge to further reduce capacitive coupling between the handle electrode and the at least one pad. As an alternative to or in addition to one more of the examples disclosed above, in some examples the input device further comprises a first pad connected directly to the current limiting resistance network and electrically coupled between the current limiting resistance network and the tip electrode, wherein the shield is configured to produce a distance between the first pad and the shield of at least 2 mm. As an alternative to or in addition to one more of the examples disclosed above, in some examples the shield is located on an outside surface of the housing.

Some examples of the disclosure are directed to an input device for providing input, comprising a housing, a tip electrode disposed at a tip end of the housing and configured for providing input to a proximate surface, a handle electrode coupled to the housing, a plurality of diodes and a current limiting resistance network in a series connection between the tip electrode and the handle electrode, and a high dielectric breakdown strength material coupled to the housing and substantially surrounding at least a portion of the series connection of the plurality of diodes and the current limiting resistance network. As an alternative to or in addition to one more of the examples disclosed above, in some examples the high dielectric breakdown strength material substantially covers an entirety of at least a front portion of the input device. As an alternative to or in addition to one more of the examples disclosed above, in some examples the input device further comprises a shield electrode coupled to the handle electrode and substantially surrounding at least a portion of the series connection of the plurality of diodes and the current limiting resistance network, the shield electrode terminating at a shield end located closest to the tip electrode. As an alternative to or in addition to one more of the examples disclosed above, in some examples the high dielectric breakdown strength material substantially surrounds the series connection between the tip electrode and the shield end of the shield electrode. As an alternative to or in addition to one more of the examples disclosed above, in some examples the input device further comprises a low dielectric breakdown strength material covering the high dielectric breakdown strength material at least at a front portion of the input device. As an alternative to or in addition to one more of the examples disclosed above, in some examples at least one diode is located between the current limiting resistance network and the handle electrode. As an alternative to or in addition to one more of the examples disclosed above, in some examples the series connection includes first, second, third and fourth component positions from the tip electrode to the handle electrode, and wherein the current limiting resistance network is located in the third component position. As an alternative to or in addition to one more of the examples disclosed above, in some examples the current limiting resistance network comprises first and second resistors connected in series, connected in parallel with third and fourth resistors connected in series. As an alternative to or in addition to one more of the examples disclosed above, in some examples the input device further comprises one or more resistors connected in series with each other and connected in parallel with at least the plurality of diodes. As an alternative to or in addition to one more of the examples disclosed above, in some examples the input device further comprises one or more voltage suppression diodes connected in series with each other and connected in parallel with at least the plurality of diodes and the current limiting resistance network.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An input device for providing input, comprising:
a housing;
a tip electrode disposed at a tip end of the housing and configured for providing input to a proximate surface;
a handle electrode coupled to the housing;
a plurality of diodes and a current limiting resistance network in a series connection between the tip electrode and the handle electrode, wherein the plurality of diodes includes a first diode and a second diode, the tip electrode is electrically coupled to an anode terminal of the first diode, and a cathode terminal of the second diode is electrically coupled to the handle electrode;
wherein at least one of the plurality of diodes is located between the current limiting resistance network and the handle electrode;
a shield electrode electrically coupled to the handle electrode and substantially surrounding at least a portion of the series connection of the plurality of diodes and the current limiting resistance network, the shield electrode terminating at a shield end located closest to the tip electrode; and
a first pad directly connected to the current limiting resistance network and electrically coupled between the current limiting resistance network and the tip electrode,
wherein a location of the first pad and the current limiting resistance network within the series connection with respect to the handle electrode is selected to produce a total parasitic capacitance between the first pad and the shield and handle electrodes of less than 147 femtofarads.

2. The input device of claim 1, wherein the series connection includes first, second, third and fourth component positions from the tip electrode to the handle electrode, and wherein the current limiting resistance network is located in the third component position.

3. The input device of claim 1, wherein the current limiting resistance network comprises first and second resistors connected in series, connected in parallel with third and fourth resistors connected in series.

4. The input device of claim 1, further comprising one or more resistors connected in series with each other and connected in parallel with at least the plurality of diodes.

5. The input device of claim 1, further comprising one or more voltage suppression diodes connected in series with each other and connected in parallel with at least the plurality of diodes and the current limiting resistance network.

6. The input device of claim 1, further comprising:
a first pad directly connected to the current limiting resistance network and electrically coupled between the current limiting resistance network and the tip electrode;
wherein a location of the first pad and the current limiting resistance network within the series connection is selected to produce an overlap of the shield electrode between first pad and the shield end of between 1.6-2.6 mm.

7. The input device of claim 1, further comprising:
a circuit board;
at least one pad for the current limiting resistance network formed on the circuit board; and
at least one routing trace of the handle electrode formed on the circuit board;
wherein at least a portion of the at least one routing trace of the handle electrode is formed along a first edge of the circuit board to reduce capacitive coupling between the handle electrode and the at least one pad.

8. The input device of claim 7, wherein the at least one pad is formed along a second edge of the circuit board opposite the first edge to further reduce capacitive coupling between the handle electrode and the at least one pad.

9. The input device of claim 1, wherein the shield is located on an outside surface of the housing.

10. An input device for providing input, comprising:
a housing;
a tip electrode disposed at a tip end of the housing and configured for providing input to a proximate surface;
a handle electrode coupled to the housing;
a plurality of diodes and a current limiting resistance network in a series connection between the tip electrode and the handle electrode, wherein the plurality of diodes includes a first diode, a second diode, and a third diode;
a high dielectric breakdown strength material coupled to the housing and substantially surrounding at least a portion of the series connection of the plurality of diodes and the current limiting resistance network;
a shield electrode electrically coupled to the handle electrode and substantially surrounding at least a portion of the series connection of the plurality of diodes and the current limiting resistance network, the shield electrode terminating at a shield end located closest to the tip electrode; and
a first pad connected directly to the current limiting resistance network and electrically coupled between the current limiting resistance network and the tip electrode,
wherein the shield electrode is configured to produce a distance between the first pad and the shield of at least 2 mm.

11. The input device of claim 10, wherein the high dielectric breakdown strength material substantially covers an entirety of at least a front portion of the input device.

12. The input device of claim 10, wherein the high dielectric breakdown strength material substantially surrounds the series connection between the tip electrode and the shield end of the shield electrode.

13. The input device of claim 10, further comprising a low dielectric breakdown strength material covering the high dielectric breakdown strength material at least at a front portion of the input device.

14. The input device of claim 10, wherein at least one diode is located between the current limiting resistance network and the handle electrode.

15. The input device of claim 10, wherein the series connection includes first, second, third and fourth component positions from the tip electrode to the handle electrode, and wherein the current limiting resistance network is located in the third component position.

16. The input device of claim 10, wherein the current limiting resistance network comprises first and second resistors connected in series, connected in parallel with third and fourth resistors connected in series.

17. The input device of claim 10, further comprising one or more resistors connected in series with each other and connected in parallel with at least the plurality of diodes.

18. The input device of claim 10, further comprising one or more voltage suppression diodes connected in series with each other and connected in parallel with at least the plurality of diodes and the current limiting resistance network.

* * * * *